(12) United States Patent  (10) Patent No.: US 9,222,239 B2
Hartwick                    (45) Date of Patent: Dec. 29, 2015

(54) ON-BOARD SERVICE TOOL AND METHOD

(75) Inventor: Ty Hartwick, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 1438 days.

(21) Appl. No.: 11/853,396

(22) Filed: Sep. 11, 2007

(65) Prior Publication Data

US 2009/0070672 A1  Mar. 12, 2009

(51) Int. Cl.
G06F 19/00 (2011.01)
E02F 5/06 (2006.01)
E02F 5/14 (2006.01)
E02F 9/26 (2006.01)

(52) U.S. Cl.
CPC . *E02F 5/06* (2013.01); *E02F 5/145* (2013.01); *E02F 9/26* (2013.01); *E02F 9/267* (2013.01)

(58) Field of Classification Search
CPC combination set(s) only.
See application file for complete search history.

(56) References Cited

U.S. PATENT DOCUMENTS

| | | | |
|---|---|---|---|
| 4,013,875 A | 3/1977 | McGlynn | |
| 4,677,579 A | 6/1987 | Radomilovich | |
| 4,699,239 A | 10/1987 | Ishino et al. | |
| 4,715,012 A | 12/1987 | Mueller, Jr. | |
| 4,727,353 A | 2/1988 | Ruhter | |
| 4,894,908 A * | 1/1990 | Haba et al. | 29/711 |
| 4,945,221 A | 7/1990 | Nielsen et al. | |
| 5,065,320 A | 11/1991 | Hayashi et al. | |
| 5,509,220 A | 4/1996 | Cooper | |
| 5,544,055 A | 8/1996 | Cooper | |
| 5,553,407 A * | 9/1996 | Stump | 37/348 |
| 5,574,642 A | 11/1996 | Cooper | |
| 5,590,041 A | 12/1996 | Cooper | |
| 5,659,470 A * | 8/1997 | Goska et al. | 701/33.4 |
| 5,768,811 A * | 6/1998 | Cooper | 37/348 |
| 6,061,617 A * | 5/2000 | Berger et al. | 701/50 |
| 6,349,252 B1 * | 2/2002 | Imanishi et al. | 701/50 |
| 6,493,616 B1 * | 12/2002 | Rossow et al. | 701/50 |
| 7,010,367 B2 * | 3/2006 | Koch et al. | 700/85 |
| 7,587,264 B2 * | 9/2009 | Furuno et al. | 701/29.6 |
| 7,769,499 B2 * | 8/2010 | McQuade et al. | 701/1 |
| 7,856,299 B2 * | 12/2010 | Fink et al. | 701/31.4 |
| 2004/0073330 A1 * | 4/2004 | Bader et al. | 700/220 |
| 2005/0085929 A1 * | 4/2005 | Koch et al. | 700/83 |
| 2005/0209747 A1 * | 9/2005 | Yakes et al. | 701/22 |
| 2005/0234603 A1 * | 10/2005 | Bale et al. | 701/2 |
| 2006/0041845 A1 * | 2/2006 | Ferguson et al. | 715/751 |

(Continued)

FOREIGN PATENT DOCUMENTS

WO    WO 00/75736 A1    12/2000
WO    WO 01/13187 A2    2/2001

OTHER PUBLICATIONS

DC2 Microcontroller, *Sauer Sundstrand*, 3 pages (Mar. 1993).

(Continued)

*Primary Examiner* — Jonathan L Sample
(74) *Attorney, Agent, or Firm* — Merchant & Gould P.C.

(57) ABSTRACT

A self-contained, on-board diagnostic system integrated with a control system and method of using the same. Various control system coefficients and parameter settings may be set and edited with the on-board system, without the use of external hardware. In certain embodiments, an operator panel display may be used as a display for the on-board system. A menu navigation scheme can be employed to access a plurality of screens in an organized, efficient manner. The on-board system can be adapted for use with a tracked trencher and/or other mobile equipment.

24 Claims, 25 Drawing Sheets

(56) References Cited

U.S. PATENT DOCUMENTS

2006/0200283 A1* 9/2006 Furuno et al. .................... 701/29
2007/0135977 A1* 6/2007 Mindeman ....................... 701/29
2009/0005928 A1* 1/2009 Sells et al. ....................... 701/33

OTHER PUBLICATIONS

DP600 Series Graphical Terminals, *Sauer Danfoss*, 2 pages (Jan. 2006).

Introducing Tesmec's all-new Mechanical Series, *Tesmec*, 2 pages pages (Publicly known at least as early as Jun. 29, 2007).

IX024-010-00000 PLUS+1 Input Module, *Sauer Danfoss*, 2 pages (Jan. 2006).

MC050-010-00000 PLUS+1 Controller, *Sauer Danfoss*, 2 pages (Jan. 2006).

MC050-020-00000 PLUS+1 Controller, *Sauer Danfoss*, 2 pages (Jan. 2006).

MCE101C Load Controller, *Sauer Sundstrand*, 3 pages (Feb. 1990).

OX024-010-00000 PLUS+1 Output Module, *Sauer Danfoss*, 2 pages (Jan. 2006).

PLUS+1 GUIDE Starter Kit and Development System, *Sauer Danfoss*, 2 pages (Jan. 2006).

PLUS+1 GUIDE User Manual, *Sauer Danfoss*, pp. 1-450 (Apr. 2007).

Invitation to Pay Additional Fees with Partial International Search mailed Mar. 20, 2009.

International Search Report and Written Opinion mailed Jun. 10, 2009.

Declaration of Ty Hartwick Relating to Software Previously Used by Vermeer Manufacturing Company w/Screen Shots; Executed Jan. 27, 2011; 22 Pages.

* cited by examiner

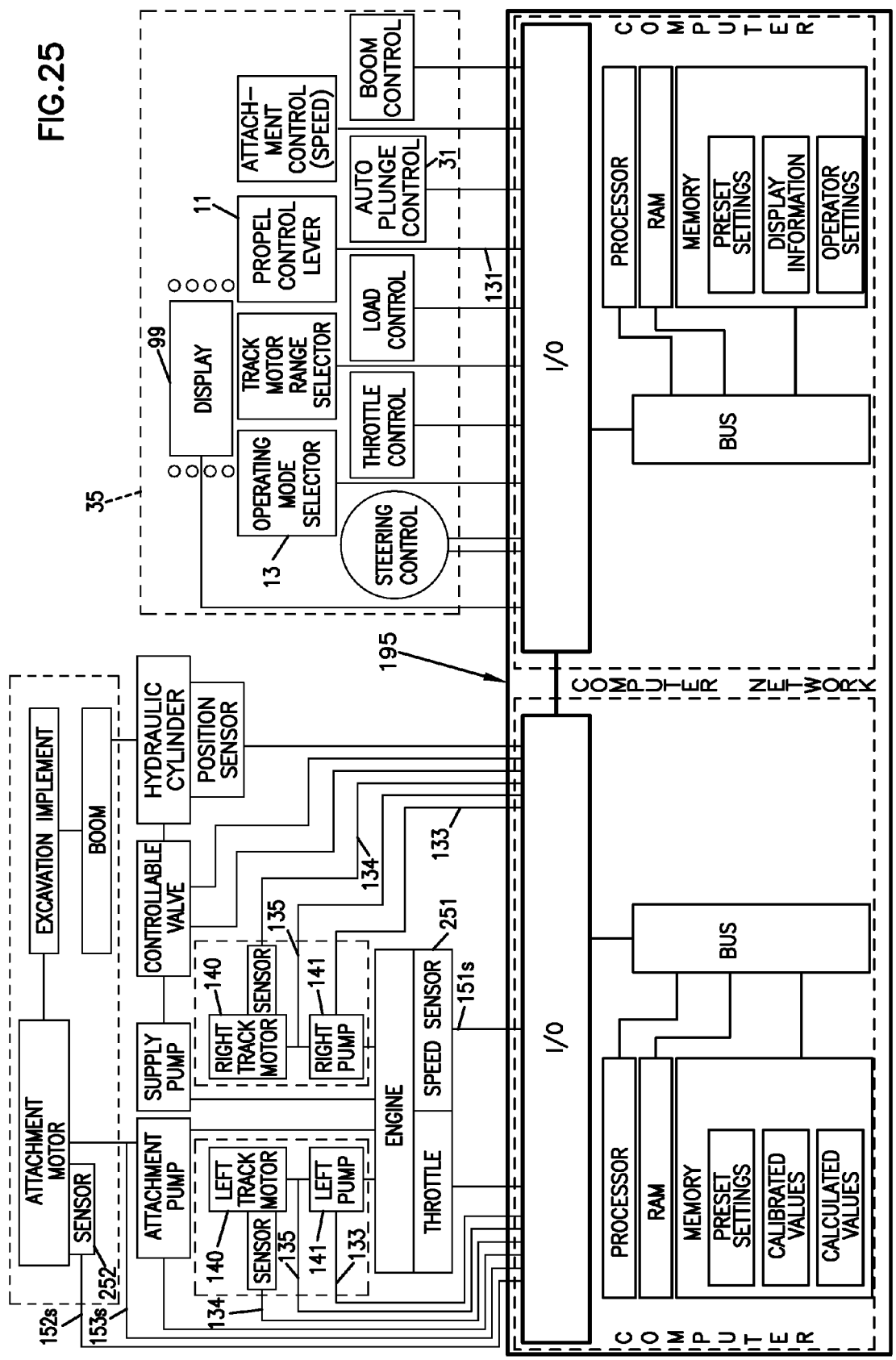

ON-BOARD SERVICE TOOL AND METHOD

TECHNICAL FIELD

The present invention relates to computerized control systems used in mobile equipment and, more particularly, to systems used for diagnosing faults within such control systems. In addition, the present invention relates to editing and calibrating values within such control systems.

BACKGROUND

Control of mobile equipment has evolved over the years with the introduction of computerized control systems. Elementary, non-computerized mobile equipment is typically controlled by direct operator intervention of each machine function, such as propulsion speed. In certain cases, feedback, such as engine speed, is provided to the operator who may adjust the machine function based on that feedback. For example, the operator of an excavation machine may directly control a hydrostatic pump displacement and manually modify that control based on an engine tachometer reading. If such a machine experiences a fault, troubleshooting is typically done by checking each function separately and tracing the problem to a faulty component, such as a broken switch or wire. Control system parameters and settings in such machines are often non-adjustable. If certain parameters and settings are adjustable, adjusting them may involve making a mechanical or electrical adjustment to a single component.

Mobile equipment with partially computerized control systems were introduced to relieve the operator from manually modifying certain machine functions and to provide rapid response to changing conditions. For example, the operator of an excavation machine may control an actual engine speed of the machine by setting a desired engine speed that is read by a control system computer. The computer may then continuously adjust a hydrostatic pump displacement to automatically maintain the actual engine speed at the desired engine speed, even as conditions change. Other machine functions, such as an excavation attachment position, may be set manually by the operator by means such as a hydraulic valve. In many cases, the control system computer of such machines has no knowledge of the manual settings but is dedicated to controlling only one or more automated functions. If such a machine experiences a fault, troubleshooting can be complicated by the presence of the computer, particularly if the fault involves a computer controlled function. In many cases, a troubleshooting/service computer, specifically designed and/or programmed for the computerized control system, is transported to the afflicted mobile equipment and attached to the control system computer to diagnose the problem. In other cases, the mobile equipment is transported to a service center to be diagnosed by the troubleshooting/service computer. In either case, significant additional downtime is incurred while bringing specialized diagnostic equipment and the afflicted mobile equipment together. In contrast with non-computerized mobile equipment, parameters and settings within the control system computer are often adjustable and, in many cases, made through the troubleshooting/service computer while they are connected.

As disclosed in U.S. Pat. No. 5,509,220 issued Apr. 23, 1996, a partially computerized control system, as mentioned in the preceding paragraph, has been adapted for use with a track trencher excavation machine 40, shown in FIGS. 1 and 2. The operating environment of the track trencher 40 varies considerably between various applications. The above patent defines various discrete modes of operation. The control system parameters and settings for each discrete mode are predefined when the track trencher 40 is manufactured. The operator may choose one of the discreet modes that best matches the application at hand. Customizing many of the computerized control system's parameters and settings to better match a given operating environment require that a troubleshooting/service computer be connected to the control system computer.

There is a desire among the manufacturers of track trenchers and other mobile equipment to minimize the difficulty of diagnosing and troubleshooting such equipment. Furthermore, there is an additional desire to facilitate appropriate control system parameter and setting modifications to facilitate improved performance of such equipment in various environments. The present invention fulfills these needs.

SUMMARY

The present disclosure relates to an on-board service tool and method for mobile equipment wherein certain control system settings and parameters are presented on a display device that resides on the mobile equipment. The displayed settings and parameters may be monitored by an operator or technician while the mobile equipment is operating and serve to diagnose and troubleshoot the mobile equipment. Furthermore, the on-board service tool and method may be used to modify certain control system settings and parameters thereby allowing customization of the mobile equipment for specific purposes and environments. In certain embodiments, a password scheme and/or other access limiting techniques are employed to serve as a barrier to unauthorized access to critical settings and parameters. In certain embodiments, the display device of the on-board service tool and a display device of an operator control panel are integrated in the same display device. In such embodiments, a menu navigation scheme is employed with logical groupings to access a plurality of screens on the display device in an organized, efficient manner. In one embodiment, the main groupings of the screens within the scheme include: 1) operator panel information, 2) control system diagnostic and troubleshooting information, 3) control system setting and parameter modification and calibration, and 4) computer network error information.

BRIEF DESCRIPTION OF THE DRAWINGS

FIG. 25 is a block diagram illustrating a computer network for controlling the operation of the track trencher, diagnosing and troubleshooting the track trencher, and calibrating and resetting the track trencher.

DETAILED DESCRIPTION

Figure 1:
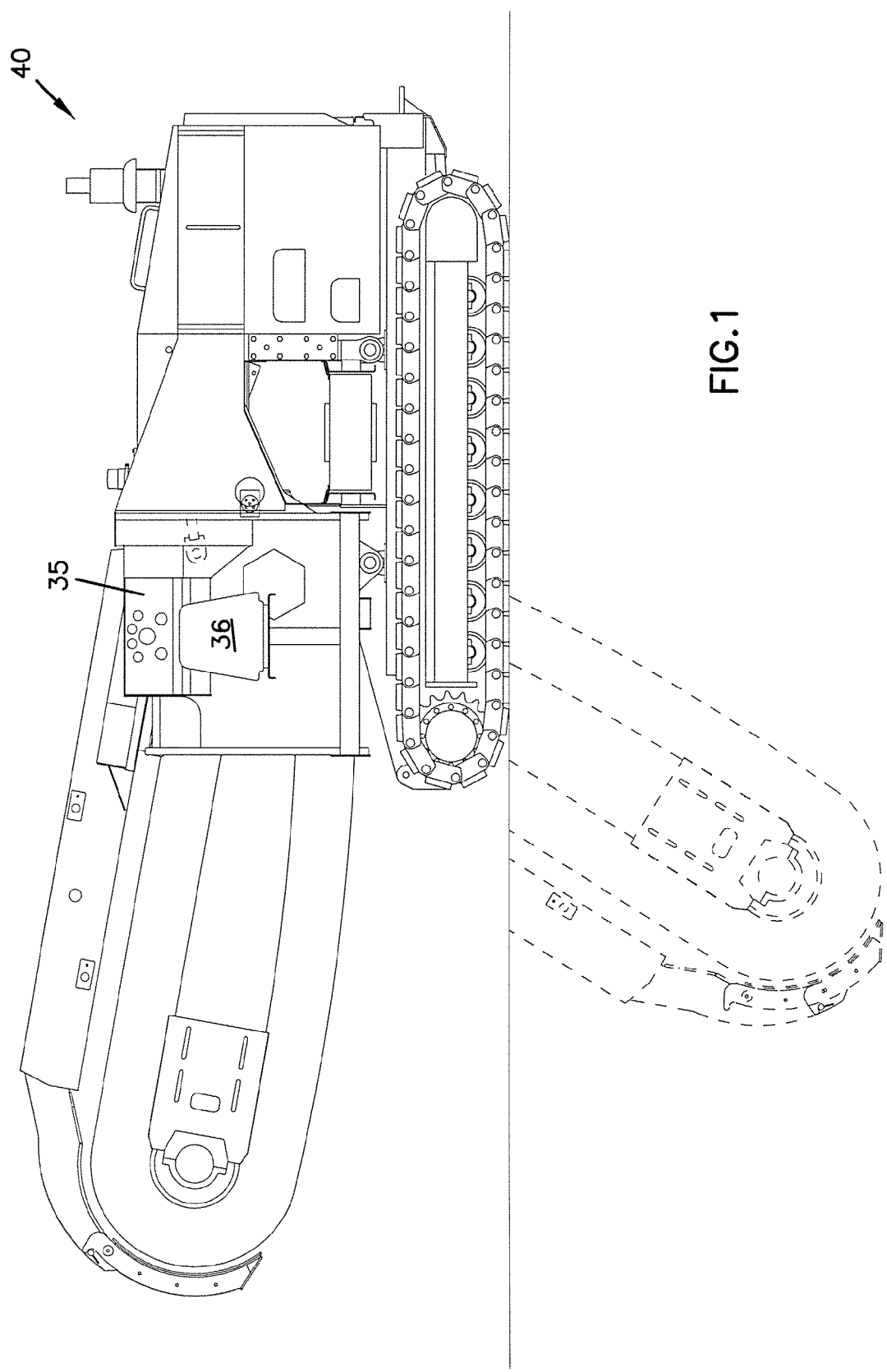
FIG. 1 is a right side view of a track trencher.

As mentioned above, control of mobile equipment has evolved over the years with the introduction of computerized control systems. Early examples typically were partially computerized control systems controlling critical machine functions while other machine functions were manually controlled by an operator. An example machine having virtually every function controlled by a control system computer or a network of control system computers is disclosed, in various embodiments, in U.S. patent application Ser. Nos. 11/770,909; 11/770,940; and 11/771,171, all filed Jun. 29, 2007, which are herby incorporated by reference in their entirety.

Computer controlled mobile equipment typically employs one or more sensors that monitor various physical parameters of the machine. Each of the sensors transmits a signal to the control system computer. Each channel of information gathered from the sensors is generally used by the computer as a machine input to moderate a particular machine function, and/or to provide the operator with information. Operator inputs typically originate at a switch, a knob, or an operator panel setting, which are also communicated to the control system computer. In response to the machine inputs and the operator inputs, the control system computer calculates a set of outputs and communicates them to various valves, pumps, display devices, etc.

In the example machine, virtually every function of the machine is monitored and controlled by a control system computer network 195. Thus, virtually every input is received by, and every output is sent by, the control system computer network 195. FIG. 25 is a block diagram illustrating the example computer network 195 with various inputs and outputs. Machine inputs include an engine speed $151s$, from an engine speed sensor 251; an attachment speed $152s$, from an attachment speed sensor 252; an attachment pressure $153s$; a left and right track speed 134; and a left and right track pressure 135. Operator inputs include a propel signal 131, generated by a propel control lever 11; a travel mode switch 13; and an auto-plunge switch 31. Control system outputs include left and right track EDC (Electronic Displacement Control) commands 133.

The present disclosure relates to a diagnostic tool and method of use that gathers and presents control system information for use in diagnosing and trouble shooting mobile equipment. In addition, the present disclosure also relates to an interface for control system setting and parameter modification and calibration, hereinafter called the parameter modification and calibration tool. In certain embodiments, the diagnostic tool and the parameter modification and calibration tool are components of an on-board service tool which is a component of the computer network 195. In an example embodiment, the on-board service tool is integrated with the computer network 195 (control system) and is self-contained, requiring no external hardware. In an example configuration, the computer network 195 includes a plurality of controllers and other components compliant with a PLUS+1™ standard defined by Sauer-Danfoss, Inc. of Ames, Iowa. Example controller modules include an MC050-010 controller module, an MC050-020 controller module, an IX024-010 input module, and an OX024-010 output module all of which are sold by Sauer-Danfoss, Inc. of Ames, Iowa. In an example configuration, various parameters and settings are stored in a non-volatile memory and a software code is held in an EPROM.

In certain embodiments of the present disclosure, the diagnostic tool presents relevant control system information on a display device. Likewise, the parameter modification and calibration tool also presents relevant information on a display device in certain embodiments. Furthermore, certain embodiments share one or more display devices to present the diagnostic tool information, the parameter modification and calibration tool information, and machine operating information. The tools and display devices mentioned in this paragraph reside on the mobile equipment and are integrated with the control system of the mobile equipment. To navigate the information presented, a menu navigation scheme is employed with logical groupings to access a plurality of screens on the display device in an organized, efficient manner. In one embodiment, the main groupings of the screens within the scheme include: 1) operator panel information, 2) control system diagnostic and troubleshooting information, 3) control system setting and parameter modification and calibration, and 4) computer network error information.

Figure 2:
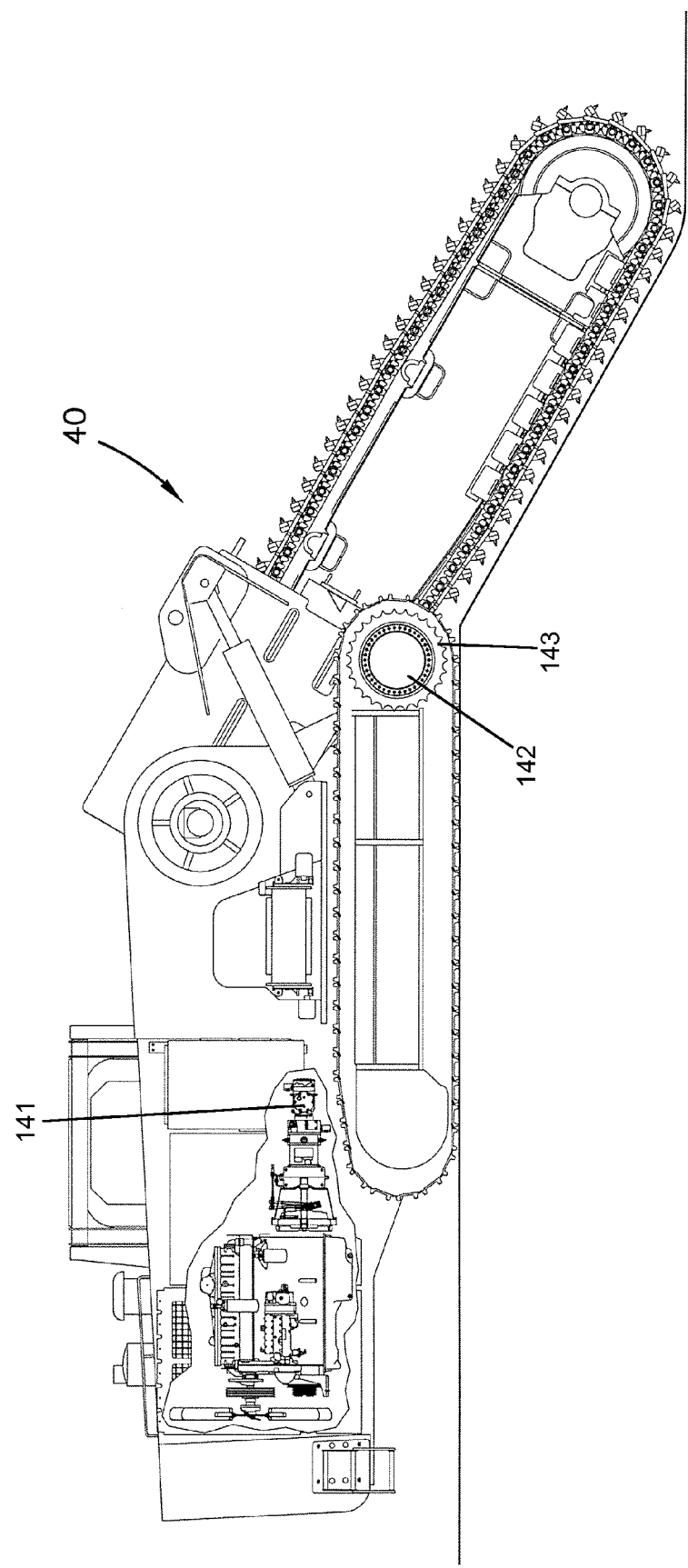
FIG. 2 is a left side view of a track trencher.
Figure 3:
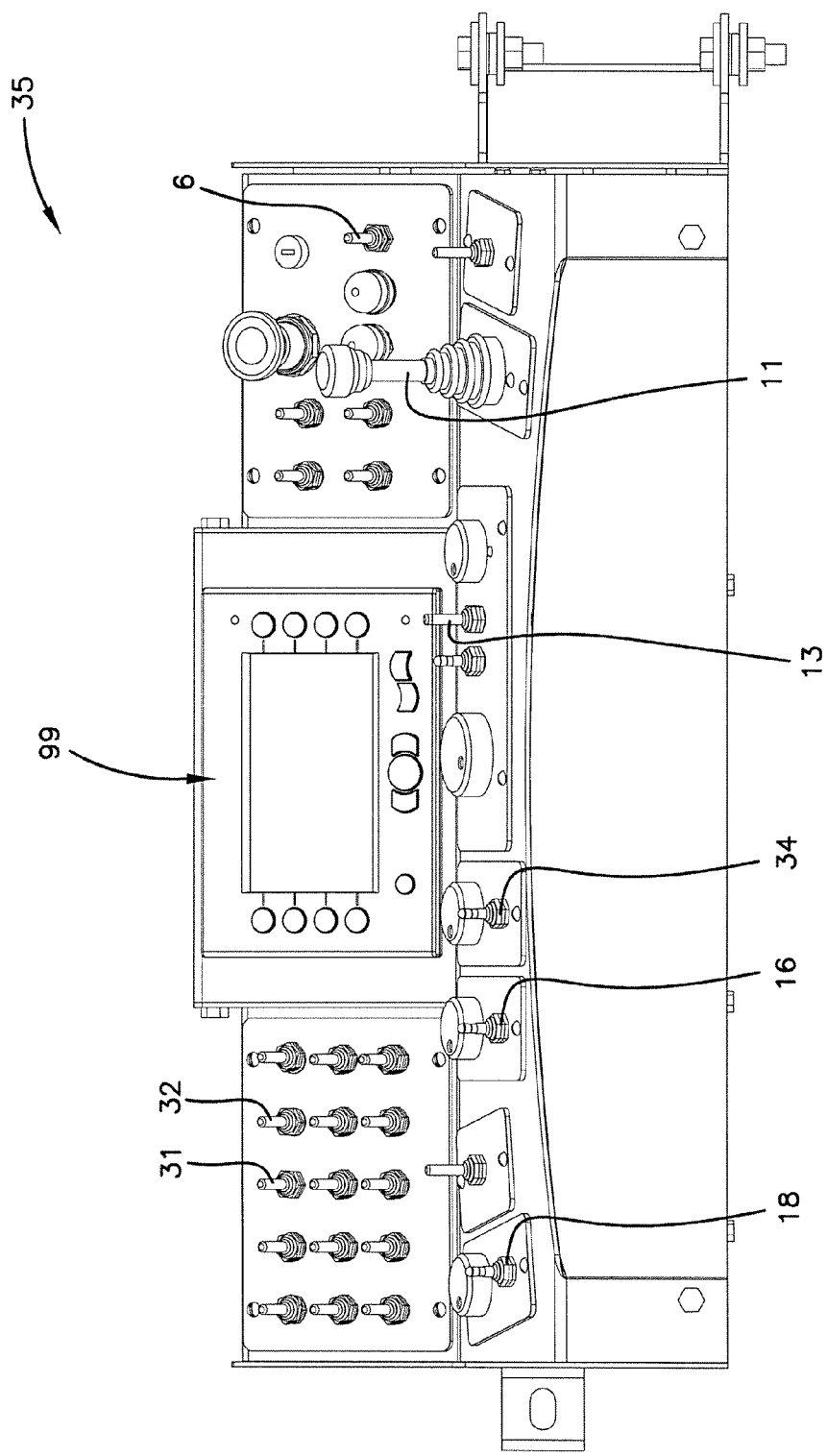
FIG. 3 is a front elevation view of a track trencher control panel including a display for displaying a plurality of screens.
Figure 4:
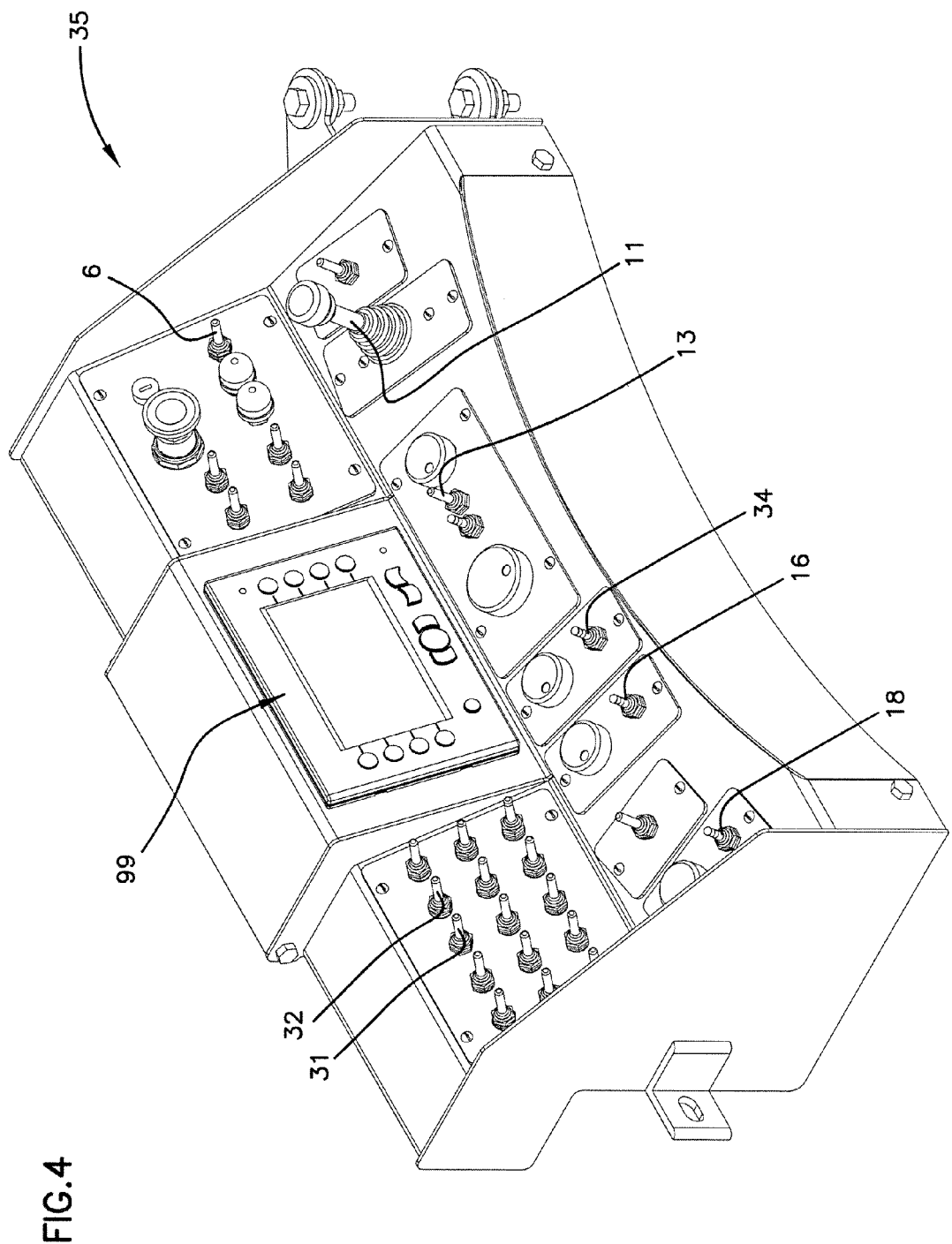
FIG. 4 is a right-front perspective view of the track trencher control panel of FIG. 3.

Referring now to the figures, and more particularly to FIGS. 3 and 4, there is shown an operator control panel 35 used to operate a track trencher 40 such as those shown in FIGS. 1 and 2. Functions of the track trencher 40 can be computer controlled as described at U.S. patent application Ser. Nos. 11/770,909; 11/770,940; and 11/771,171, which were previously incorporated by reference. Included on the control panel 35 are various operator input devices such as a parking brake switch 6, the propel control lever 11, the travel mode switch 13, a cross-conveyor control 16, an attachment control 18, the auto-plunge switch 31, an auto down pressure switch 32, an auxiliary conveyor control 34, and various other input devices. A display panel 99 serves as an operator input device for a plurality of operator inputs that are described below. Certain inputs of the display panel 99 operator inputs are used in the routine operation of the track trencher 40 and function essentially the same as the switches and controls mentioned above. The display panel 99 also serves as an output device, displaying to the operator a plurality of trencher information, also described below. Certain displayed outputs are also used in the routine operation of the track trencher 40 and function essentially the same as a dial, warning light, gage, etc. An operator seat 36, illustrated in FIG. 1, is fitted with a switch indicating if the operator is sitting in the seat 36 and serving as an operator input device.

In an example embodiment, the display panel 99 is a single display device which displays three operator panel information screens 101, 102, and 103 one at a time. In addition, a system interlock screen 104 and an active warning indicator screen segment 105 are displayed under certain conditions described below. These four screens 101, 102, 103, and 104 and one screen segment 105 are typically used in the routine operation of the track trencher 40 by the operator.

Figure 5:
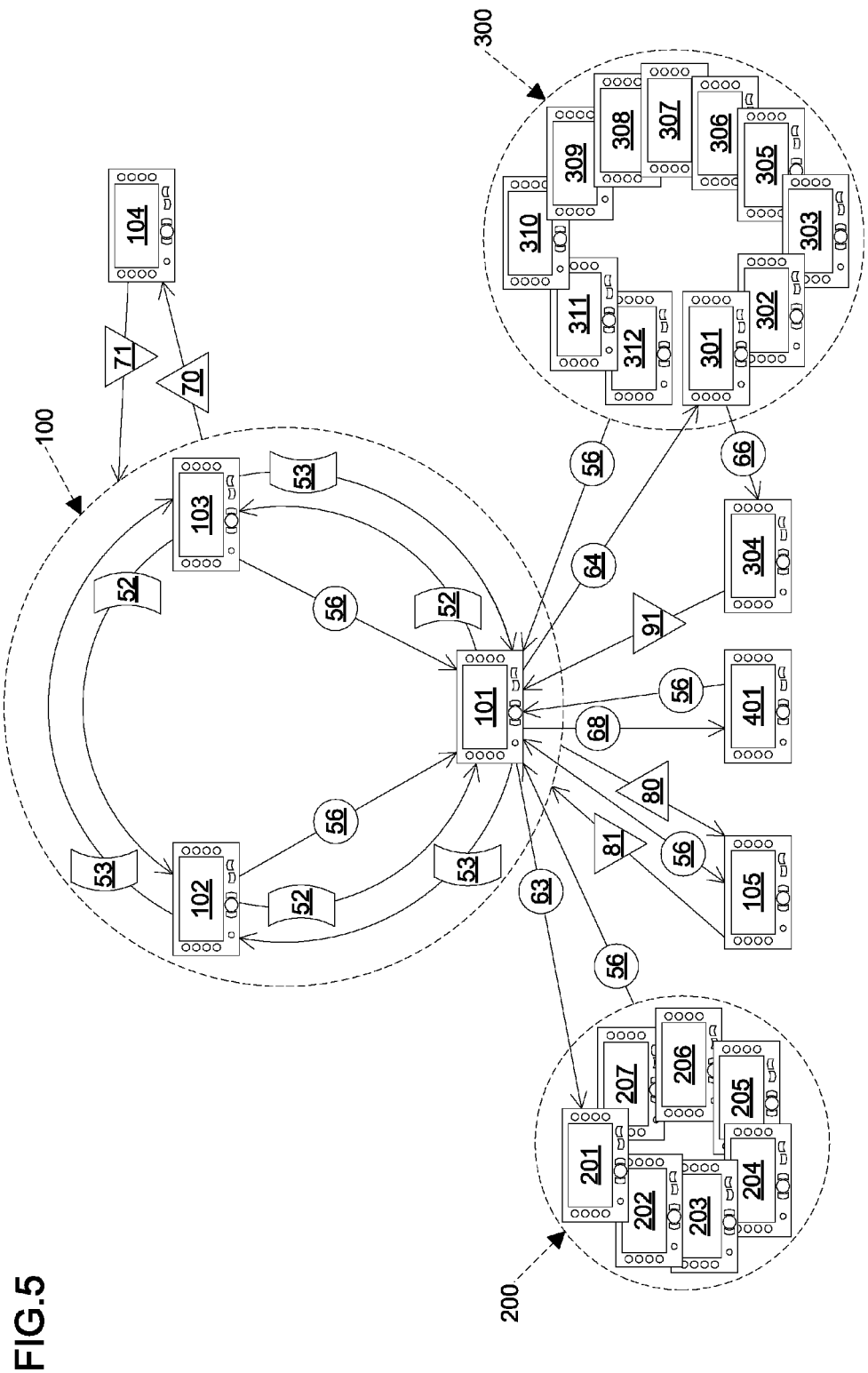
FIG. 5 is a top-level navigation map illustrating how the various screens displayed on the display of FIG. 3 are selected for viewing and how the various screens are grouped.
Figure 8:
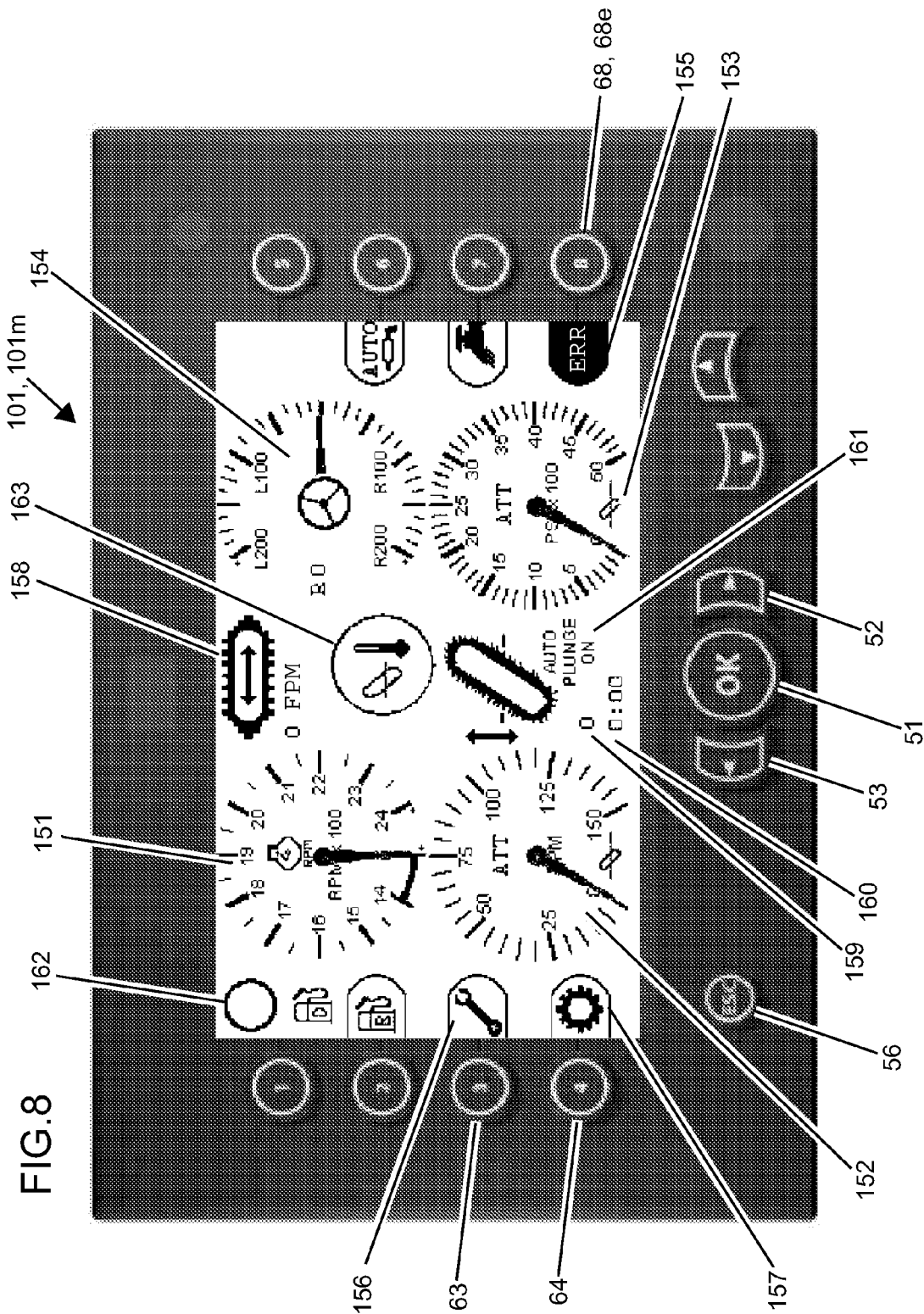
FIG. 8 is a screen shot of a first and main operator panel information screen of FIG. 5.
Figure 9:
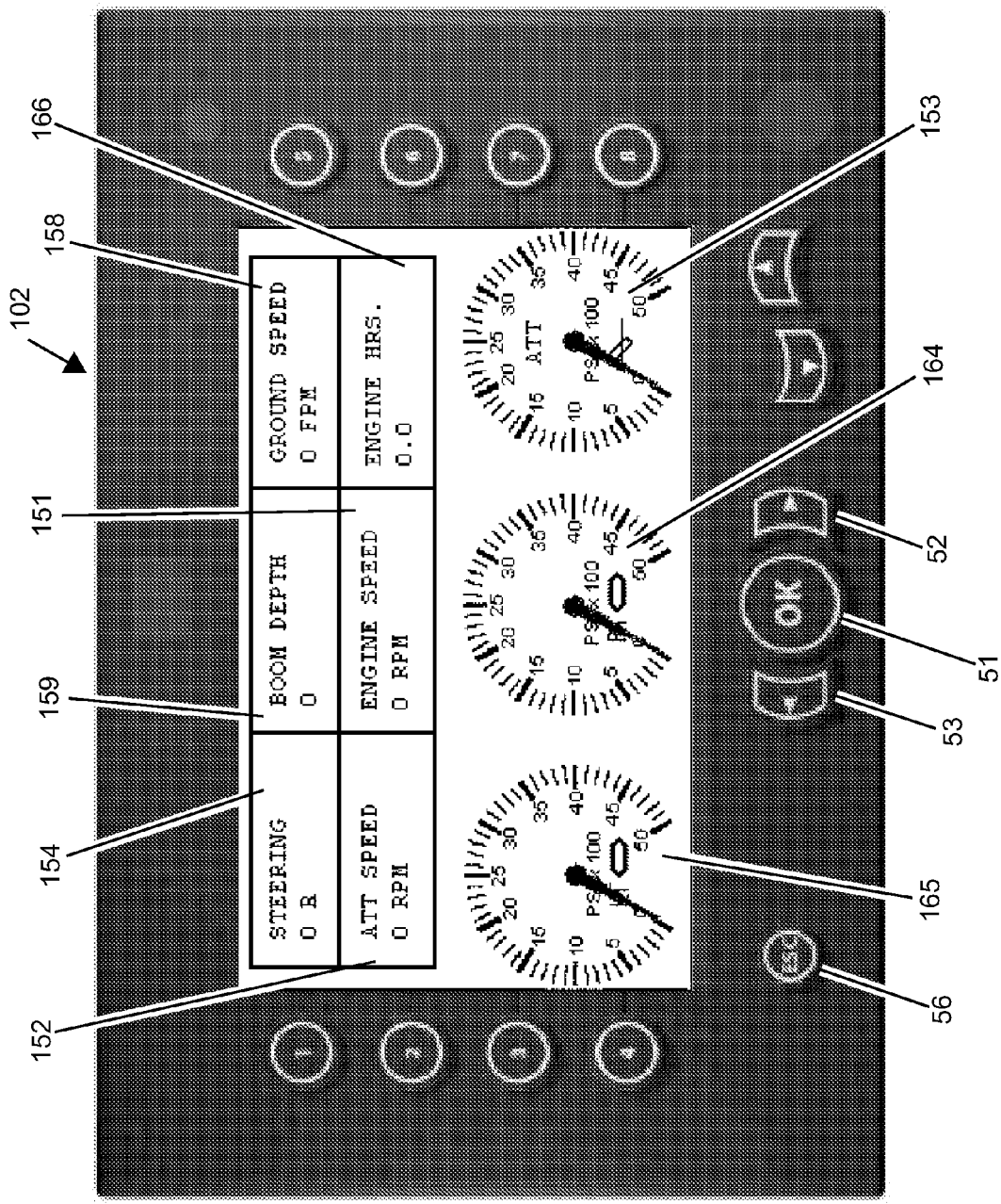
FIG. 9 is a screen shot of a second and subsidiary operator panel information screen of FIG. 5.
Figure 10:
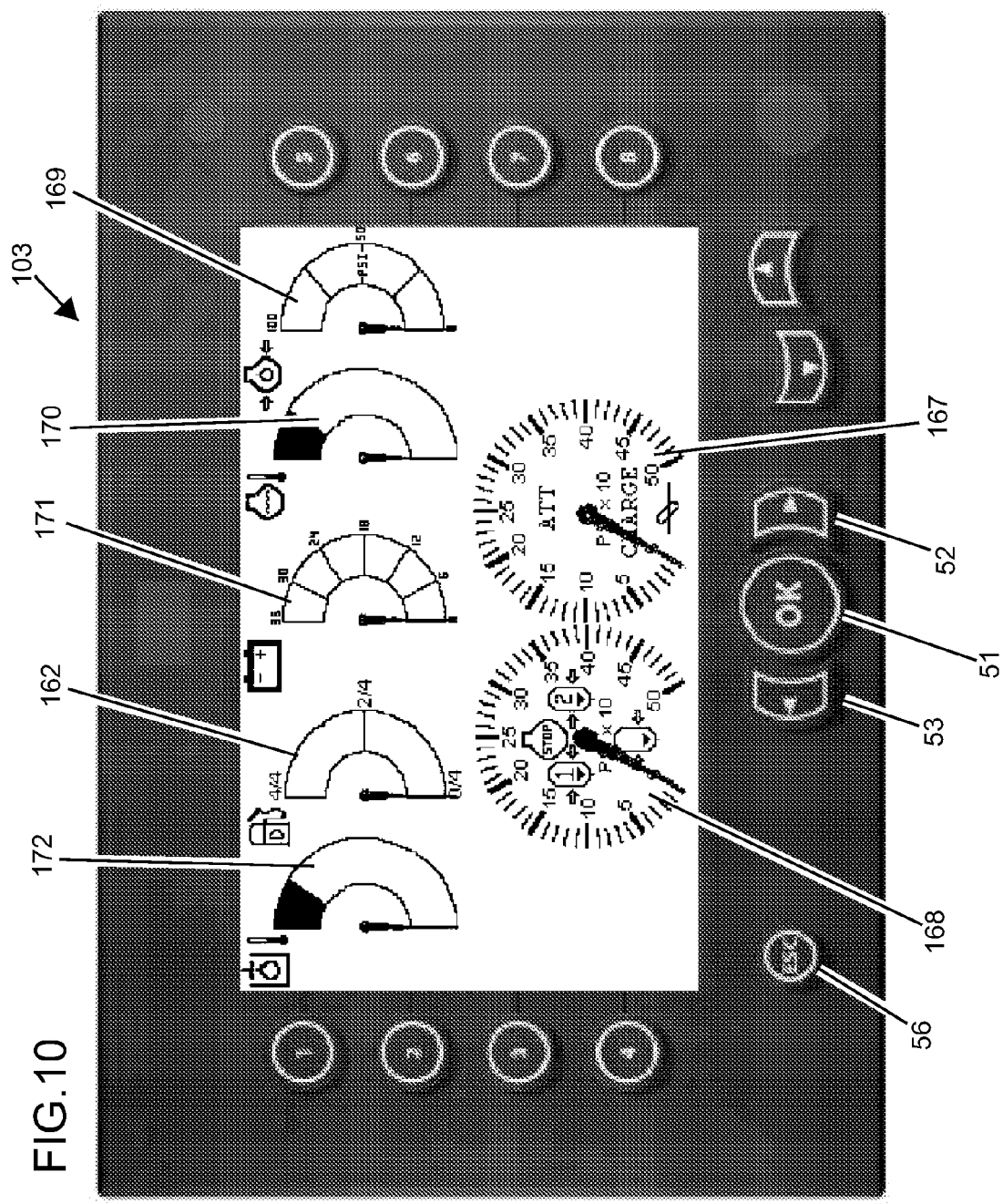
FIG. 10 is a screen shot of a third and subsidiary operator panel information screen of FIG. 5.

As illustrated in FIG. 5, the screens 101, 102, and 103 form a group of operator panel information screens 100. Also illustrated in FIG. 5 is a method to navigate between the screens 101, 102, and 103 by pressing a right scroll button 52, a left scroll button 53, and an escape button 56. FIGS. 8 through 10 illustrate an example of the machine operating information displayed on these screens 101, 102, and 103. Included are an engine speed 151, an attachment speed 152, an attachment pressure 153, a steering position 154, a track direction and speed 158, a boom depth 159, a time of day clock 160, an auto-plunge status 161, a fuel level status 162, a hydraulic oil temperature difference warning 163, a right track pressure 164, a left track pressure 165, an engine hour clock 166, an attachment charge pressure 167, an accumulator pre-charge pressure 168, an engine oil pressure 169, an engine coolant temperature 170, a system voltage 171, and a hydraulic oil temperature 172. In an example embodiment, a main operator panel information screen 101m (see FIG. 8) is also an initial screen and appears upon turning the track trencher 40 power on. In other embodiments, a startup screen is the initial screen and briefly appears before the main screen 101m. In still other embodiments, the initial screen 101, 102, or 103 can be selected by pressing an OK button 51 while that screen is displayed.

Figure 11:
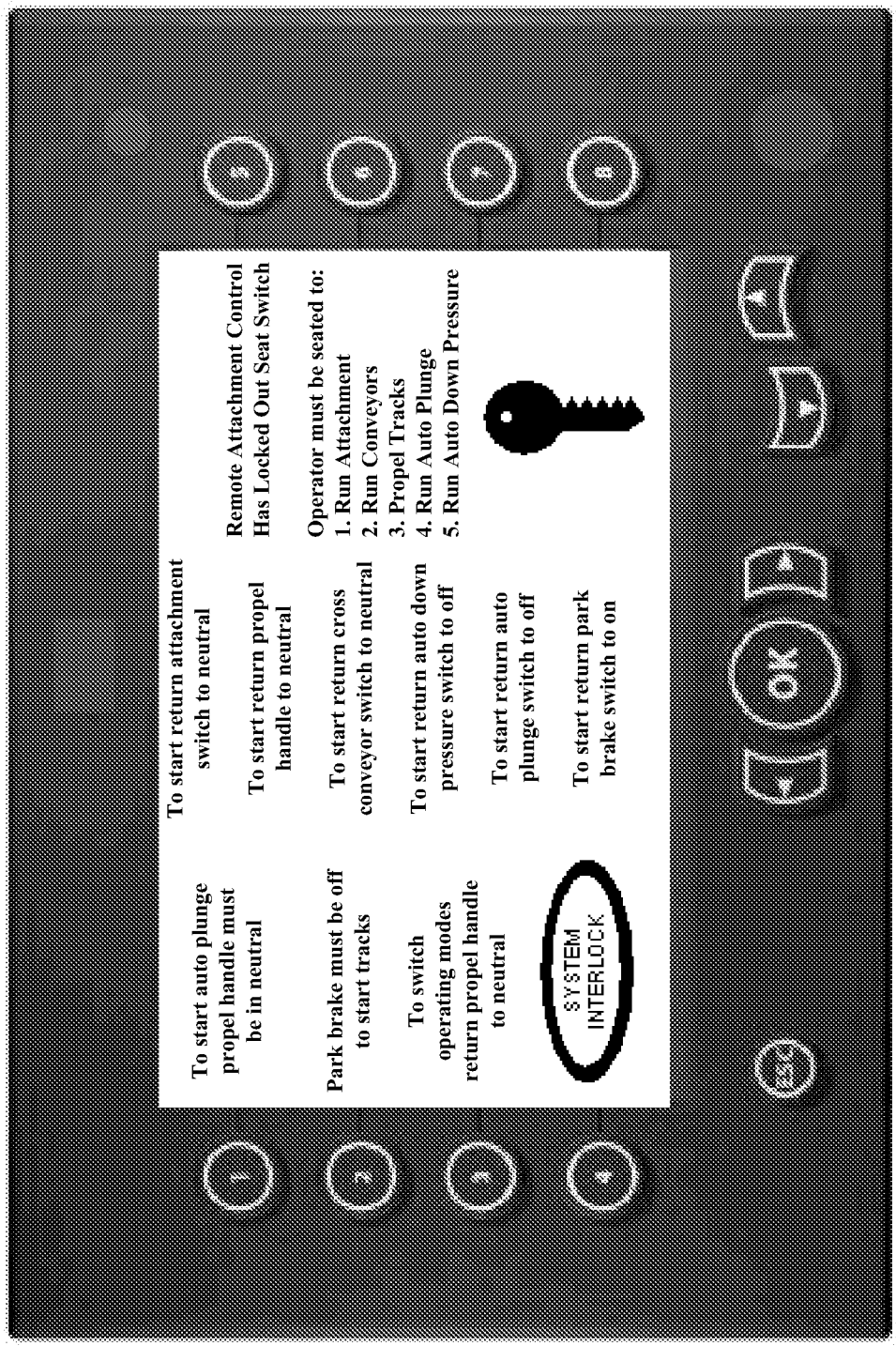
FIG. 11 is a screen shot of a fourth operator panel information screen of FIG. 5 that is displayed while a control system interlock condition is present.

In certain embodiments, if certain conditions exist on the track trencher 40, certain functions of the track trencher 40 become temporarily disabled and unavailable for selection. For example, if the operator is not sitting in the operator seat 36, the auto-plunge switch 31 will become unresponsive and that function will be disabled. Attempting to use such a function during such a track trencher 40 condition results in a control system interlock 70 that temporarily disables the function. Upon clearing 71 the control system interlock, the attempted function becomes available. For example, upon the operator sitting in the operator seat 36, the auto-plunge switch 31 again becomes responsive. To alert the operator that one of the control system interlocks 70 is present, the system interlock screen 104 replaces the current operator panel information screen 101, 102, or 103 on the display panel 99. The system interlock screen 104 provides the operator information on how to clear 71 the control system interlock as illustrated in FIG. 11. FIG. 5 further illustrates the system interlock screen 104 and its relationship to the operator panel information screens 101, 102, and 103.

Figure 12:
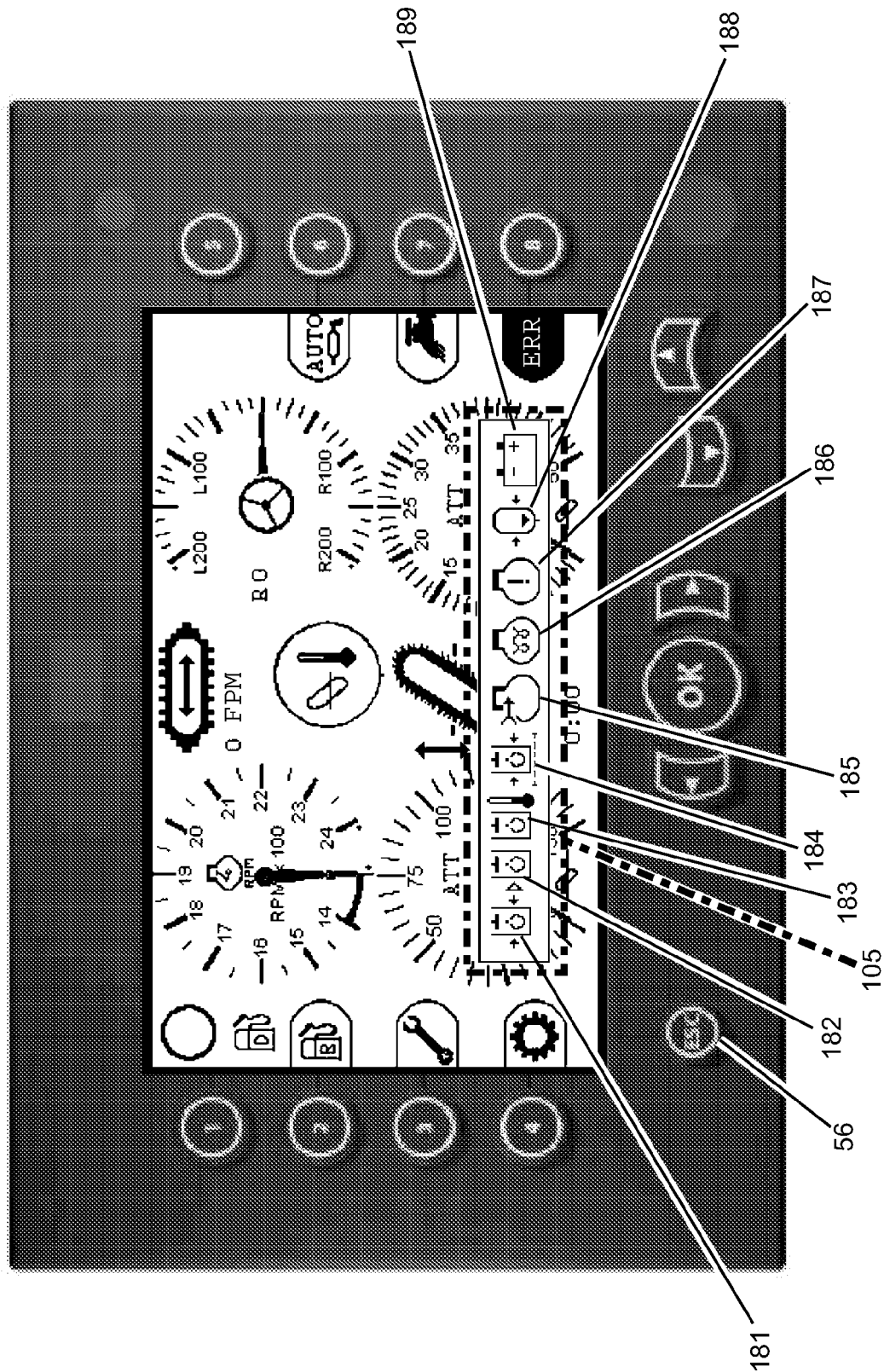
FIG. 12 is a screen shot illustrating an active warning indicator screen segment which overlays the screens of FIGS. 8 through 10 while an abnormal or wait to start machine condition is present.
Figure 13:
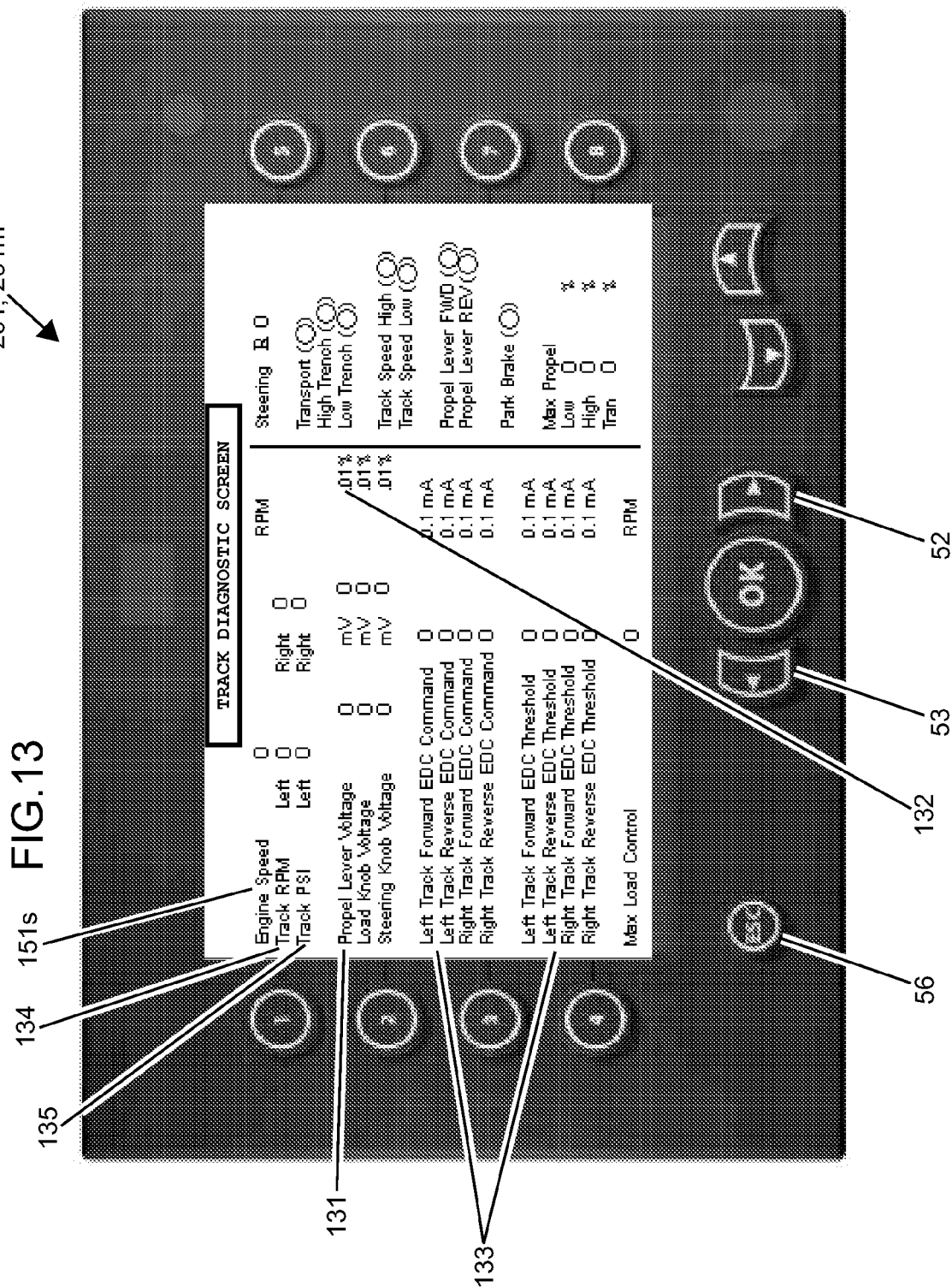
FIG. 13 is a screen shot of a first and main control system diagnostic and troubleshooting information screen of FIGS. 5 and 6.
Figure 14:
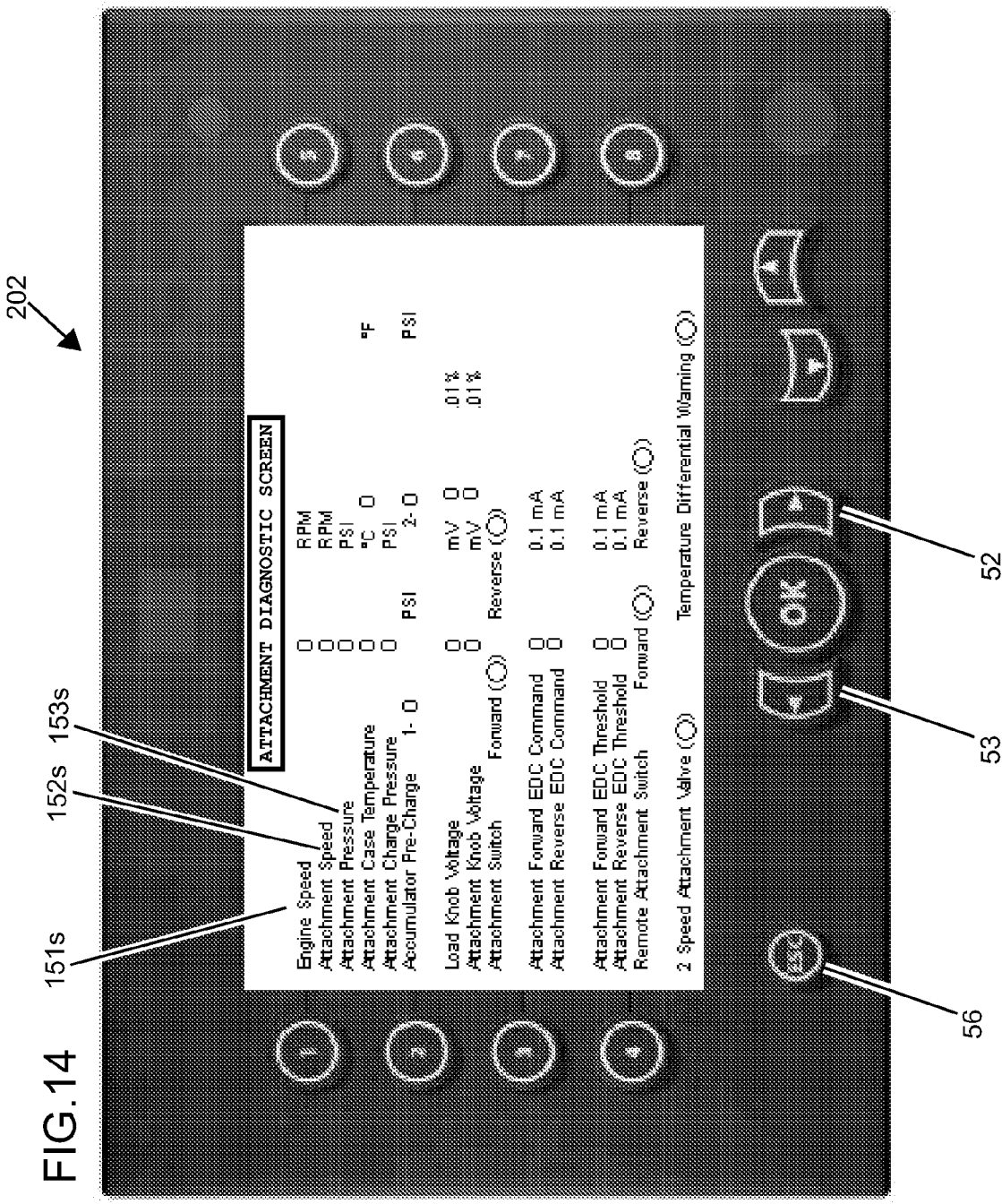
FIG. 14 is a screen shot of a second and subsidiary control system diagnostic and troubleshooting information screen of FIGS. 5 and 6.
Figure 15:
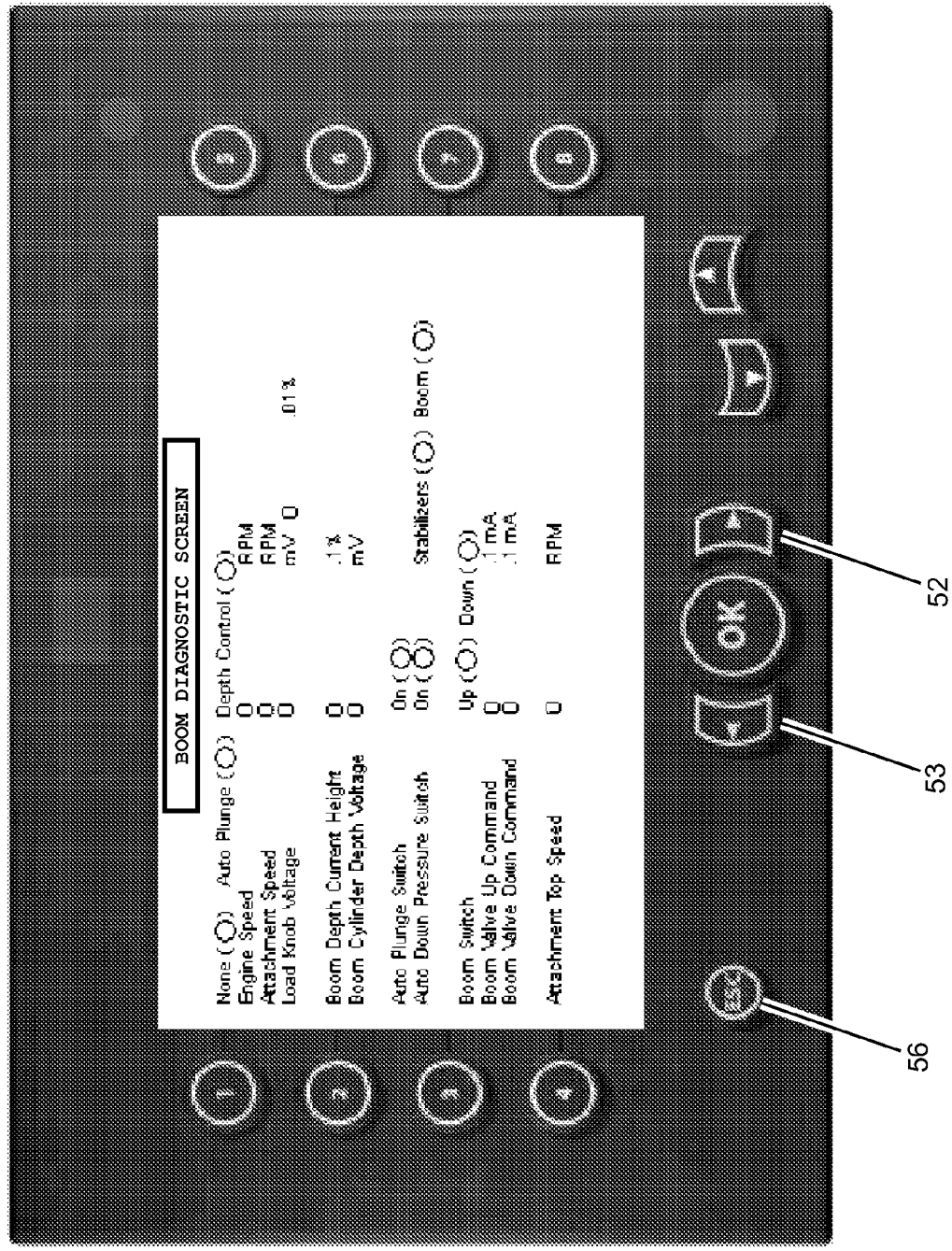
FIG. 15 is a screen shot of a third and subsidiary control system diagnostic and troubleshooting information screen of FIGS. 5 and 6.
Figure 16:
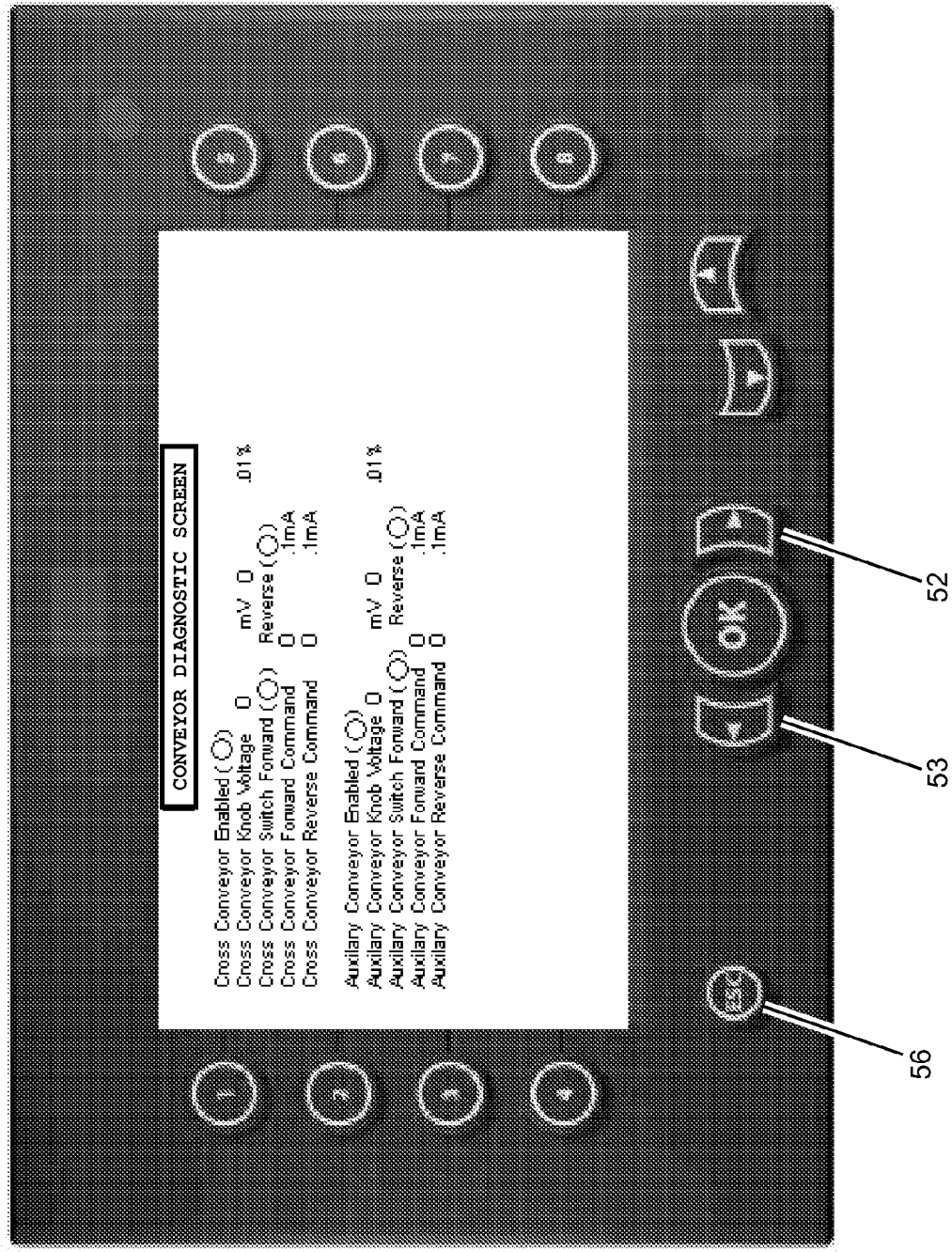
FIG. 16 is a screen shot of a fourth and subsidiary control system diagnostic and troubleshooting information screen of FIGS. 5 and 6.
Figure 17:
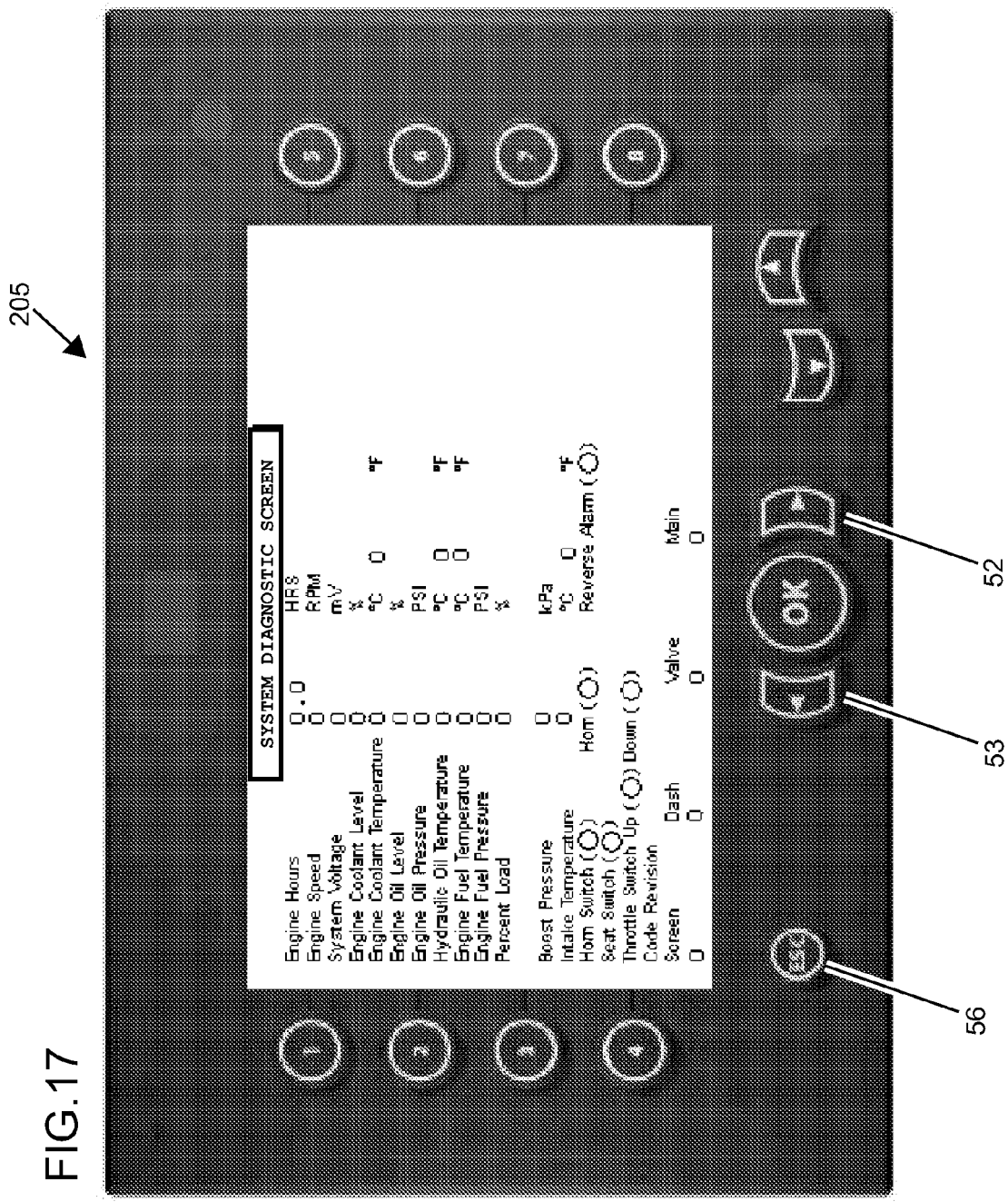
FIG. 17 is a screen shot of a fifth and subsidiary control system diagnostic and troubleshooting information screen of FIGS. 5 and 6.
Figure 18:
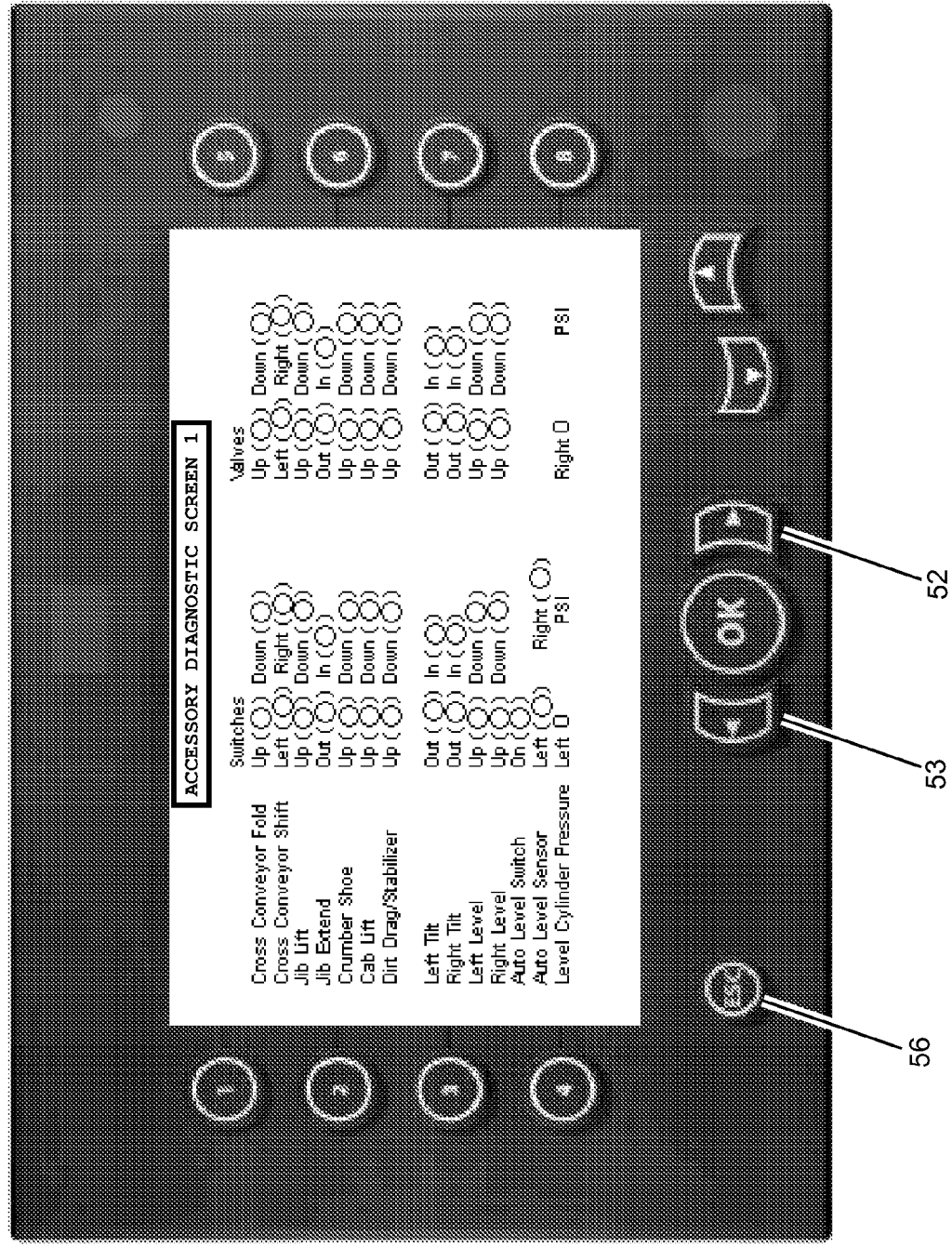
FIG. 18 is a screen shot of a sixth and subsidiary control system diagnostic and troubleshooting information screen of FIGS. 5 and 6.
Figure 19:
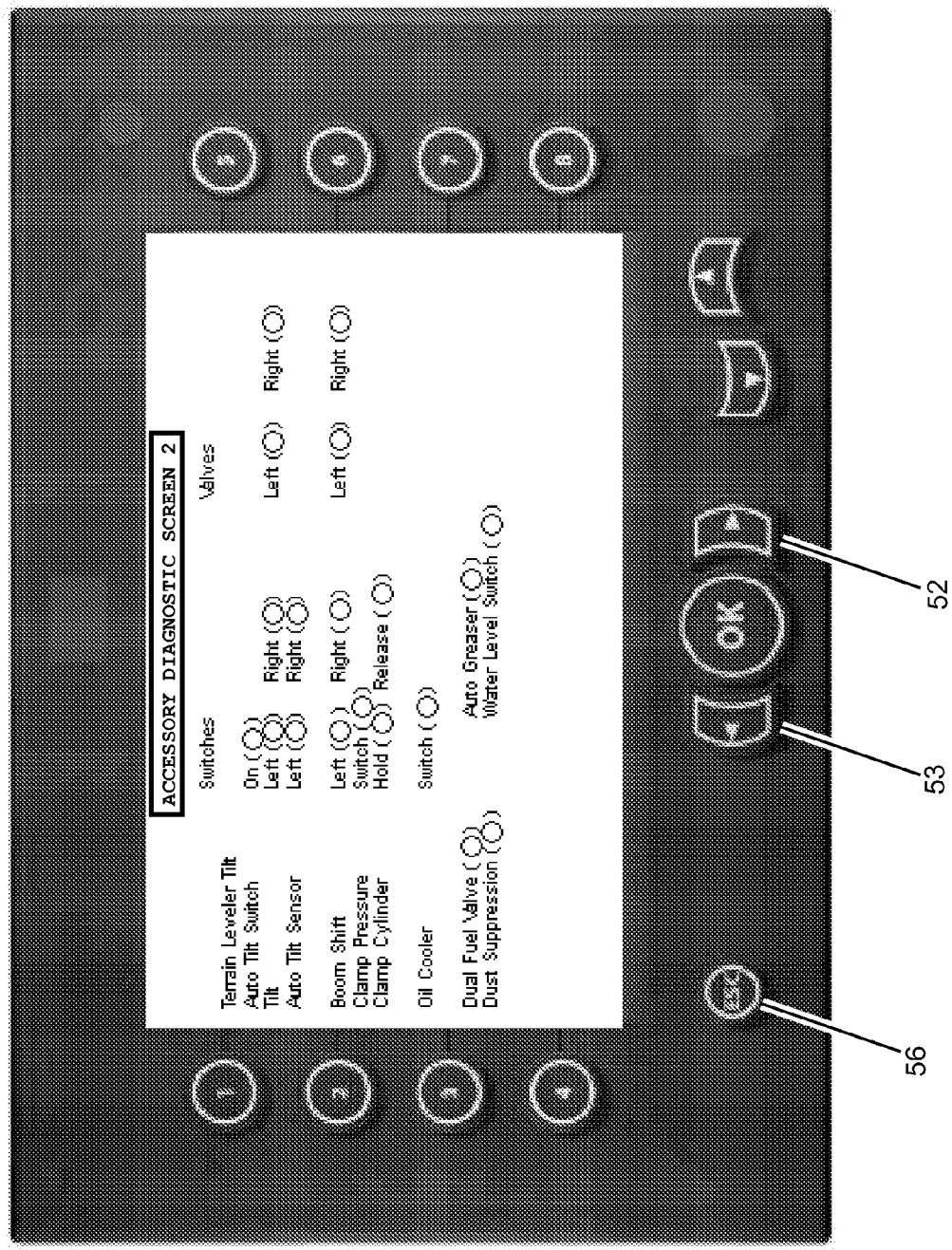
FIG. 19 is a screen shot of a seventh and subsidiary control system diagnostic and troubleshooting information screen of FIGS. 5 and 6.
Figure 20:
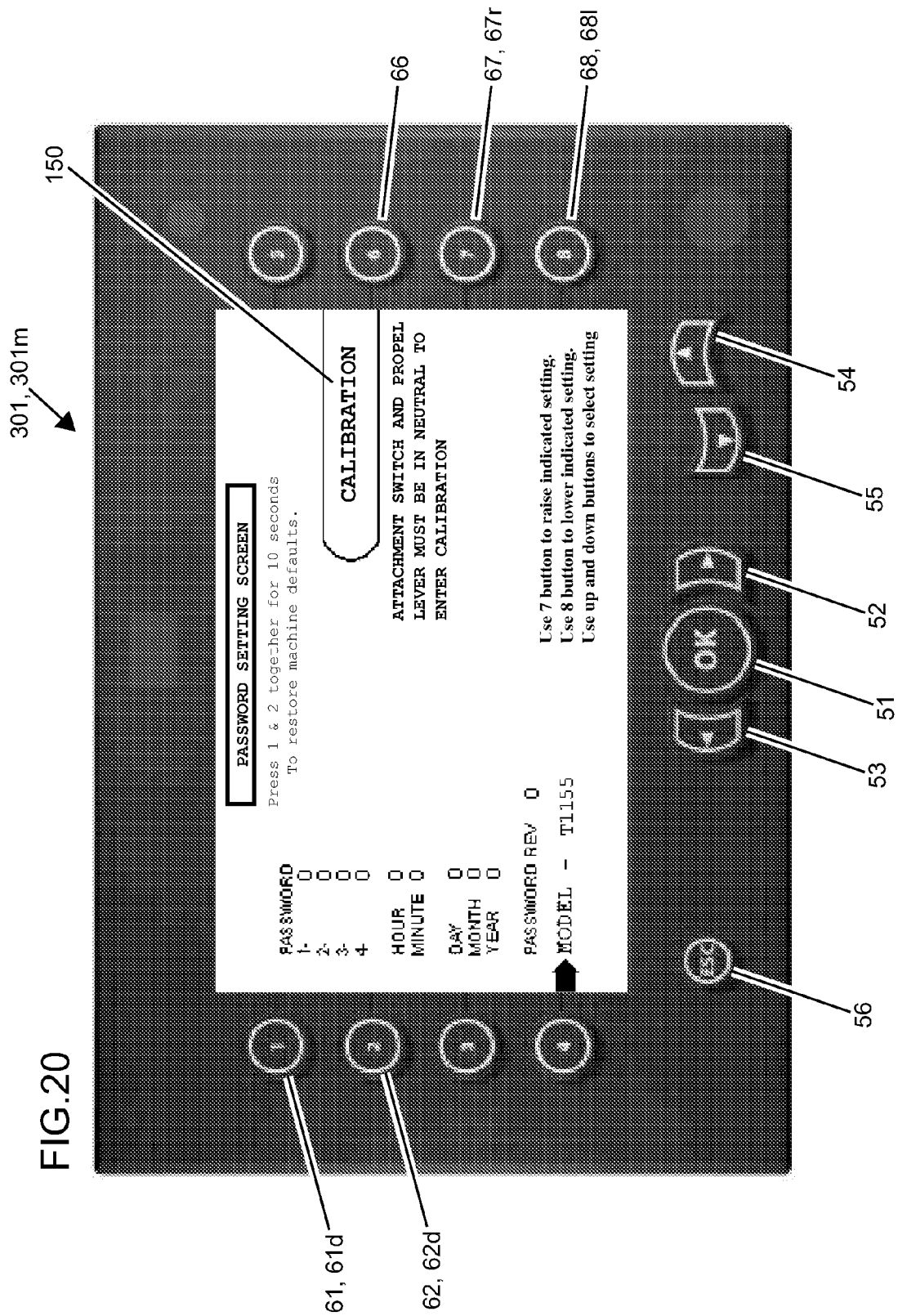
FIG. 20 is a screen shot of a first and main control system setting and parameter modification and calibration screen of FIGS. 5 and 7.
Figure 21:
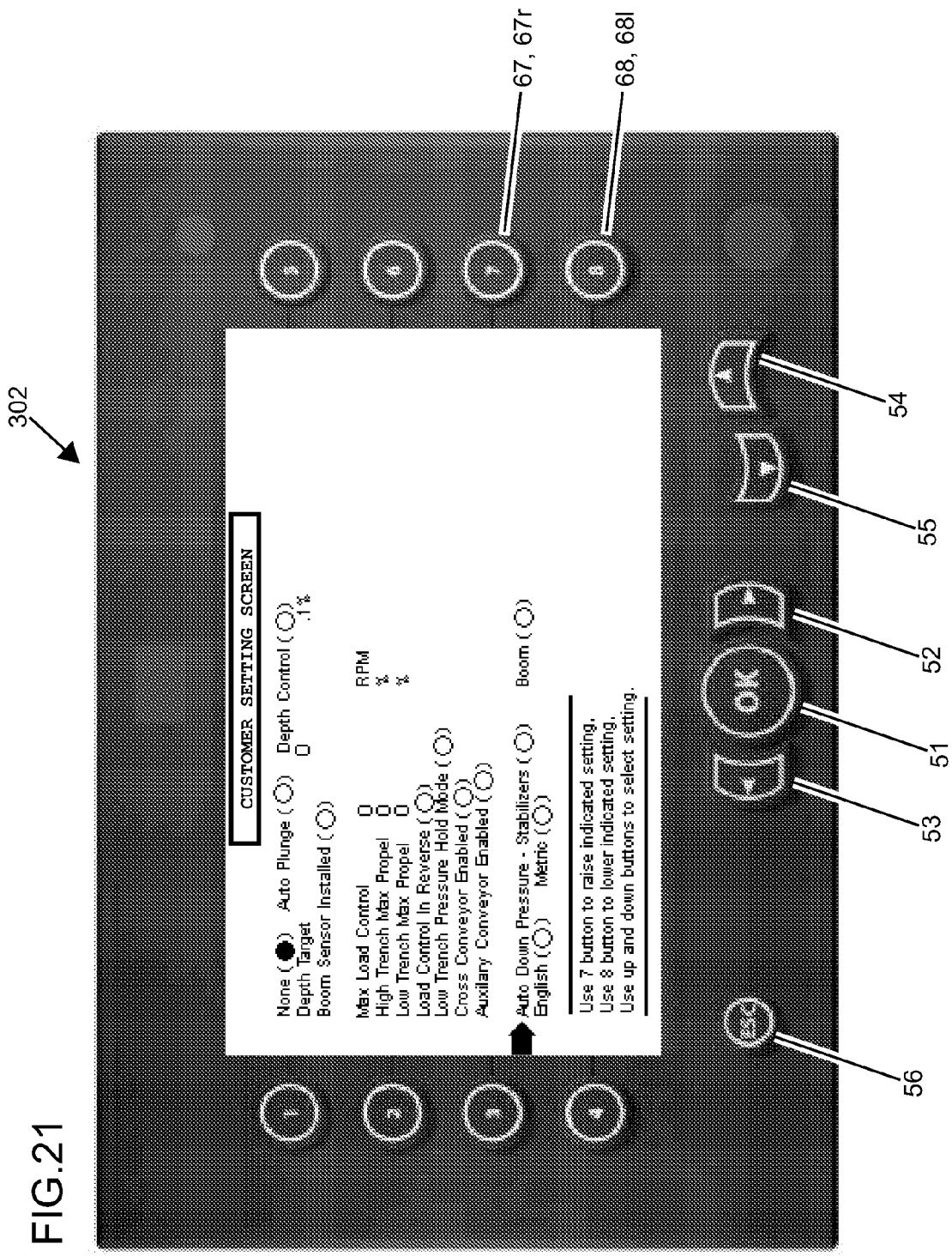
FIG. 21 is a screen shot of a second and subsidiary control system setting and parameter modification and calibration screen of FIGS. 5 and 7.
Figure 22:
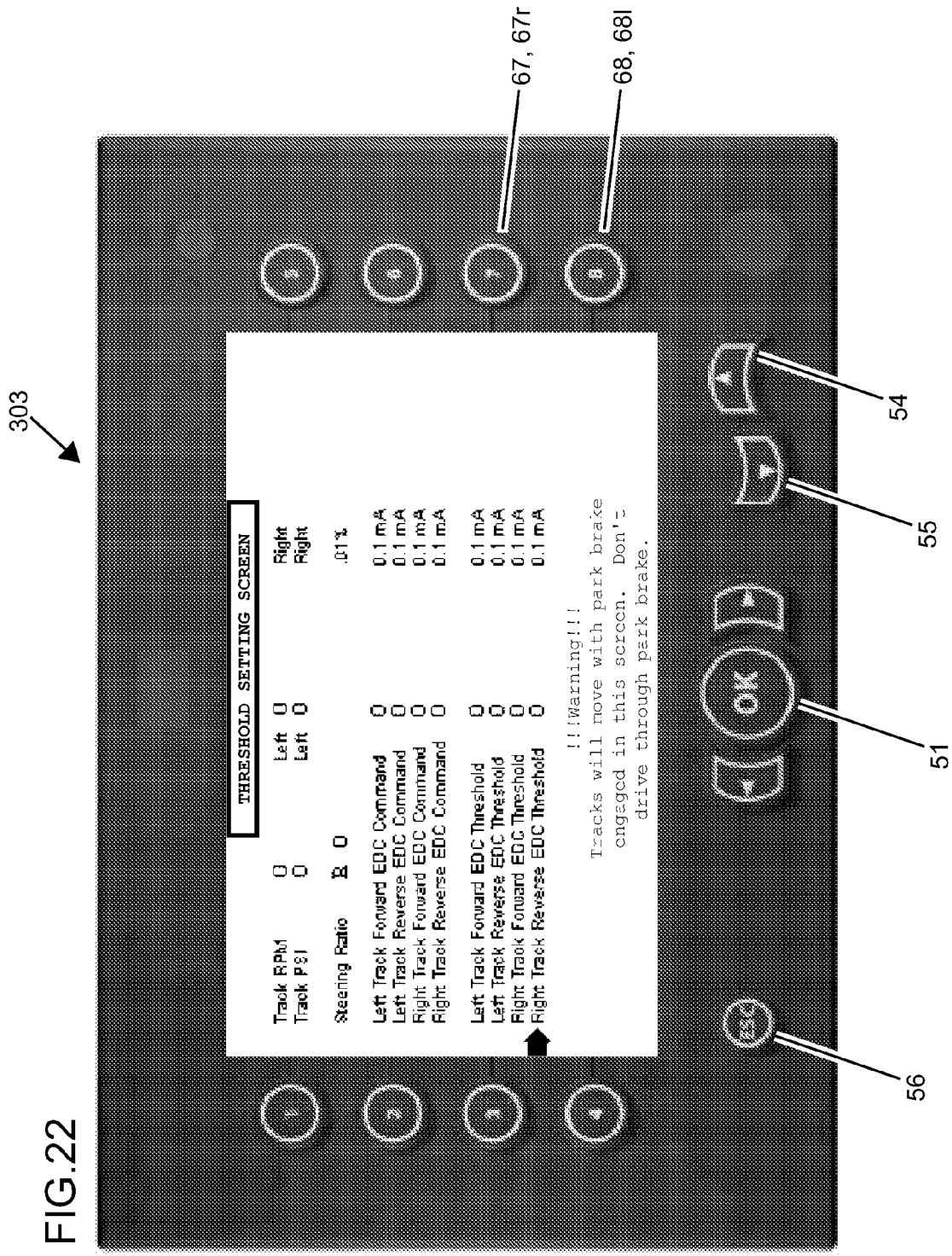
FIG. 22 is a screen shot of a third and subsidiary control system setting and parameter modification and calibration screen of FIGS. 5 and 7.
Figure 23:
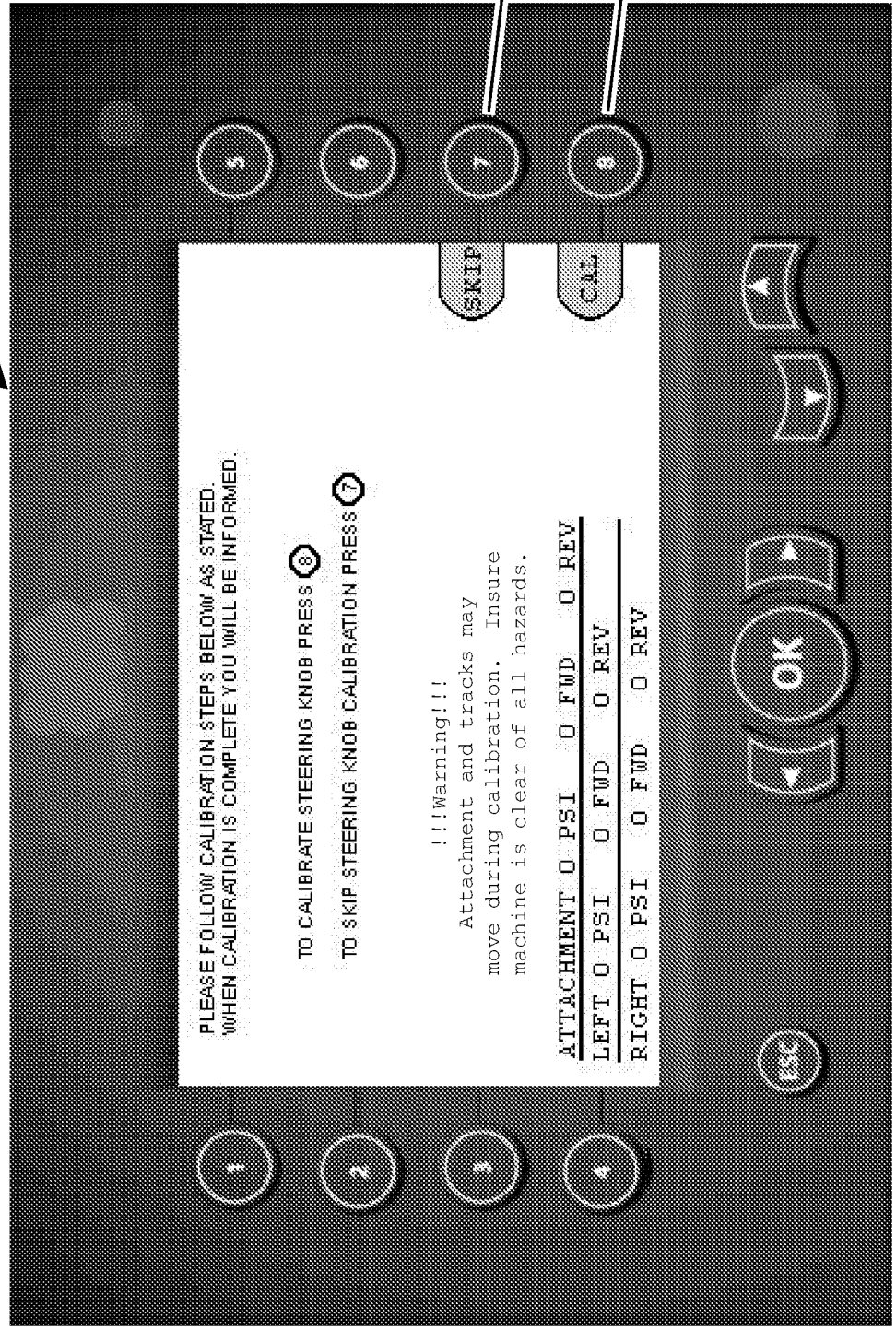
FIG. 23 is a screen shot of a fourth and subsidiary control system setting and parameter modification and calibration screen of FIGS. 5 and 7.
Figure 24:
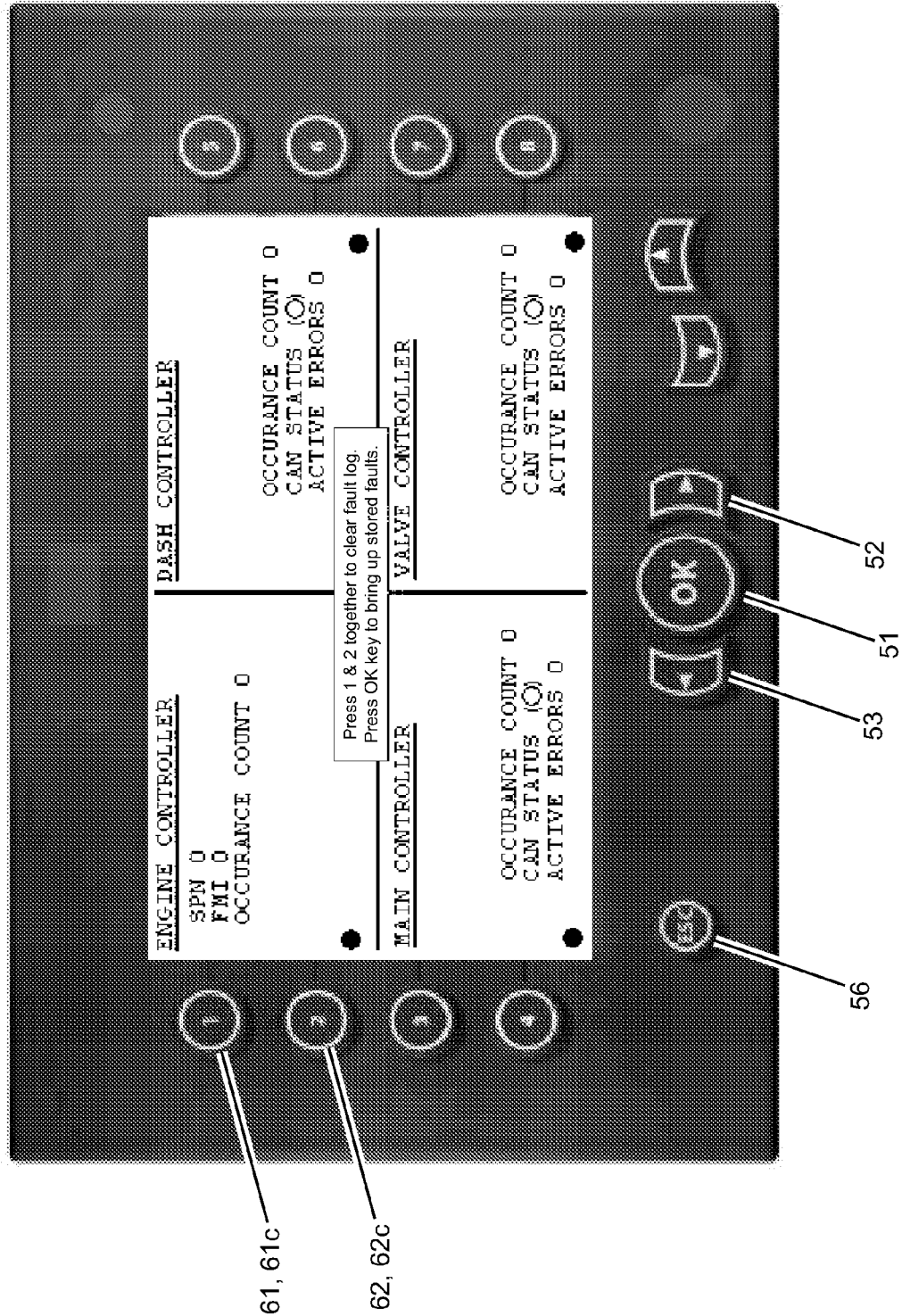
FIG. 24 is a screen shot of a first and main computer network error information screen of FIG. 5.

In certain embodiments, if an abnormal, wait to start, and/or other special condition 80 exist on the mobile equipment, the active warning indicator screen segment 105, or a part thereof, overlays a portion of the current operator panel information screen 101, 102, or 103 as illustrated in FIG. 12. Upon removal 81 of the abnormal, wait to start, and/or other special condition, the active warning indicator screen segment 105 is also removed. As illustrated in FIG. 5, pressing the escape button 56 while the active warning indicator screen segment 105 is active, temporarily returns the display to screen 101 and removes the warning screen segment 105. Upon releasing the escape button 56, the active warning indicator screen segment 105 returns if the abnormal, wait to start, and/or other special condition 80 still exists. FIG. 12 illustrates an example of the active warnings displayed on the screen segment 105. Included are a pump drive oil pressure warning 181, a low hydraulic oil level warning 182, a high hydraulic oil temperature warning 183, a hydraulic filter restriction warning 184, an air restriction warning 185, a wait to start warning 186, an engine error warning 187, a low accumulator pre-charge warning 188, and a system voltage warning 189.

In addition to displaying outputs used in the routine operation of mobile equipment, the present disclosure relates to displaying outputs used while diagnosing and troubleshooting mobile equipment, constituting the diagnostic tool mentioned above. The diagnostic tool is especially useful when applied to fully computerized mobile equipment, as in the example above. A preferred embodiment of the present disclosure includes the diagnostic tool within the control system, and thus on-board the mobile equipment. Adjoining the diagnostic tool and the mobile equipment eliminates the need to transport and connect the diagnostic tool to the mobile equipment. Furthermore, incorporating and integrating the diagnostic tool into the overall control system of the mobile equipment insures that it is always available to the operator/technician to provide diagnostic information. Thus, the on-board diagnostic tool can easily be used while the machine is in actual operation at a work-site. Intermittent faults can therefore be detected in the environment in which they occur. In a preferred embodiment, the diagnostic tool is self-contained and requires no external hardware to function.

FIGS. 6 and 13 through 19 illustrate a particular embodiment of the diagnostic tool adapted for use with the track trencher 40. The current status of virtually all control system variables of the track trencher 40 are listed on a series of diagnostic screens 200 including a track diagnostic screen 201, an attachment diagnostic screen 202, a boom diagnostic screen 203, a conveyor diagnostic screen 204, a system diagnostic screen 205, a first accessory diagnostic screen 206, and a second accessory diagnostic screen 207. The display panel 99 displays the diagnostic screens 201, 202, 203, 204, 205, 206, and 207 one at a time.

Figure 6:
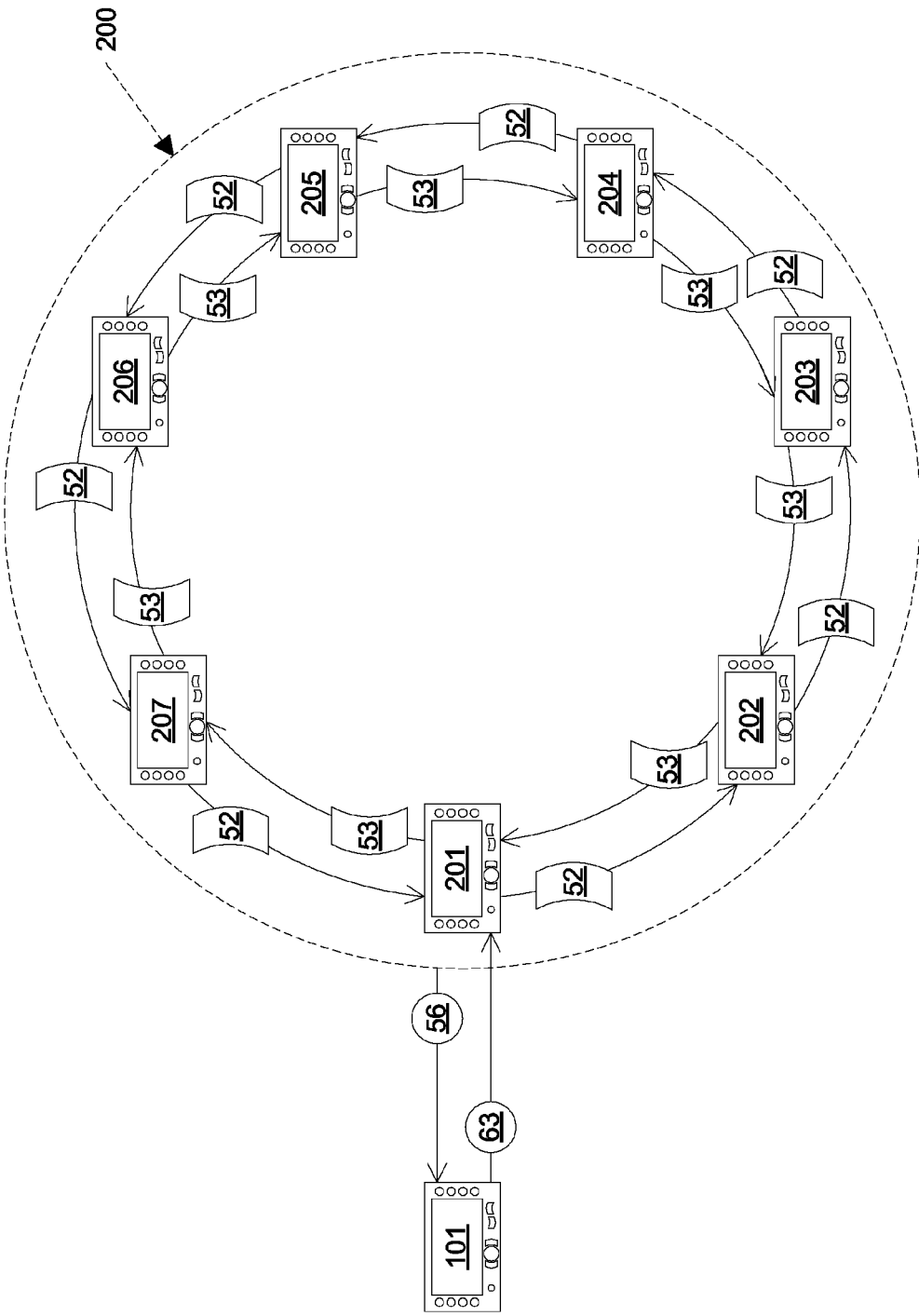
FIG. 6 is a first, mid-level navigation map further illustrating how the various screens of FIG. 5, relating to a group of control system diagnostic and troubleshooting information screens, are selected for viewing.

FIGS. 5 and 6 illustrates how to access the diagnostic screens 200 from the main operator panel information screen 101m. This is accomplished by pressing a diagnostic menu button 63 which results in the display of the track diagnostic screen 201. Thus the track diagnostic screen 201 serves as a main diagnostic information screen 201m (see FIG. 13). A diagnostic menu navigation icon 156 is located near the diagnostic menu button 63 on screen 101 to symbolize this. Pressing the escape button 56 from any of the diagnostic screens 200 returns the main operator panel information screen 101m. Navigation between the diagnostic screens 201, 202, 203, 204, 205, 206, and 207 is accomplished by pressing the right scroll button 52 or the left scroll button 53 as illustrated in FIG. 6.

Displaying the current status of virtually every control system variable on the diagnostic tool allows efficient diagnosis and troubleshooting of the track trencher 40. Furthermore, applying this technique to the example track trencher 40, having virtually every signal and setting in communication with the computer network, affords this benefit to virtually every component and sub-system. Various sub-system diagnostic information is logically grouped together on a particular screen 201, 202, 203, 204, 205, 206, and 207 to facilitate efficient diagnosing and troubleshooting of that particular sub-system. In certain cases, a particular piece of information, such as engine speed, may appear on more than one of the screens 201, 202, 203, 204, 205, 206, and 207.

The information contained within the diagnostic tool helps pinpoint a particular fault. For example, if the propel control lever 11 is unresponsive, displaying the track diagnostic screen 201 (see FIG. 13) allows direct observation of a propel lever voltage 131. Upon moving the propel control lever 11, the displayed propel lever voltage 131 should change correspondingly. Additionally, a propel lever voltage percentage 132 should be between −100% and +100%. If the propel lever voltage 131 remains at 0 mV, a faulty electrical ground or broken signal wire is likely and should be checked. If the propel lever voltage 131 is erratic and/or exceeds the ±100% range, a propel lever potentiometer is potentially defective and should be checked. If the propel lever voltage 131 behaves normally, other checks should be done. Also, on the same screen 201, the left and right track EDC (Electronic Displacement Control) commands 133 are listed. These EDC commands 133 are sent to hydrostatic pumps 141 to control hydraulic flow rates as illustrated in FIG. 25. In troubleshooting the unresponsive propel control lever 11, the listed EDC commands 133 should respond to the propel lever voltage 131 and result in a track RPM 134 and track PSI 135. If the track RPM 134 and the track PSI 135 are unresponsive to various EDC commands 133, the hydrostatic pump 141, a hydrostatic motor 140, and/or a hydraulic pressure line may be defective and should be checked. If the track RPM 134 responds but the track PSI 135 does not, a gearbox 142 between the hydrostatic motor 140 and a track drive sprocket 143 may be defective and should be checked.

The information presented on the diagnostic screens 201, 202, 203, 204, 205, 206, and 207 is near real time, delayed by the processing and scan times of the computer network. For most purposes, this is equivalent to real time. In addition, the track trencher 40 can be operated normally while the information is being displayed. These features provide the benefit of troubleshooting faults that are intermittent and/or occur under certain operating conditions.

The preceding paragraphs illustrate a particular embodiment of the diagnostic tool contained within the computer network for diagnosing and troubleshooting various components of the control system. In the event that an error occurs within the computer network itself, a computer network error information screen 401 is available in certain embodiments of the present disclosure. An example computer network error information screen 401 is suited to diagnose and troubleshoot control system computer network components including a main controller, an engine controller, a dash controller, and a valve controller. FIG. 5 illustrates how the computer network error information screen 401 is accessed from the main operator panel information screen 101m. This is accomplished by pressing button 68 on screen 101 which results in the display of the computer network error information screen 401. On this particular screen 101, the button 68 serves as a controller error menu button 68e. Thus the computer network error information screen 401 serves as a main computer network error information screen 401m. A controller error menu navigation icon 155 is located near the controller error menu button 68e on screen 101 to symbolize this. Pressing the escape button 56 from the computer network error information screen 401 returns the main operator panel information screen 101m. In certain embodiments, more than one computer network error information screen may exist. In this case, navigation between the computer network error information screens may be accomplished by pressing the right scroll button 52 or the left scroll button 53. Retrieving stored controller faults may be accomplished by pressing the OK button 51 on screen 401. To clear a controller error fault log, buttons 61 and 62 are pressed together on screen 401. On this particular screen 401, the buttons 61 and 62 serve as controller fault log clearing buttons 61c and 62c.

In addition to displaying outputs used in the routine operation and troubleshooting of mobile equipment, the present disclosure relates to the parameter modification and calibration tool mentioned above. The parameter modification and calibration tool is especially useful when applied to fully computerized mobile equipment, as in the example identified above. A preferred embodiment of the present disclosure includes the parameter modification and calibration tool within the control system, and thus on-board the mobile equipment. Adjoining the parameter modification and calibration tool and the mobile equipment eliminates the need to transport and connect the parameter modification and calibration tool to the mobile equipment. Furthermore, incorporating and integrating the parameter modification and calibration tool into the overall control system of the mobile equipment insures that it is always available to the operator/technician to allow calibration and parameter modification. Thus, the on-board parameter modification and calibration tool can easily be used while the machine is in actual operation at a work-site. Near immediate results to calibrations and parameter modifications can be observed while in the field. In a preferred embodiment, the parameter modification and calibration tool is self-contained and requires no external hardware to function.

FIGS. 7 and 20 through 23 illustrate a particular embodiment of the parameter modification and calibration tool adapted for use with the track trencher 40. Virtually all control system parameters relating to the track trencher 40 are modifiable on a series of parameter modification screens 300 including a password setting screen 301, a customer setting screen 302, a threshold setting screen 303, a first track setting screen 305, a second track setting screen 306, a third track setting screen 307, an attachment setting screen 308, a boom setting screen 309, a conveyor setting screen 310, a system setting screen 311, and a track tuning screen 312. A calibration screen 304 is also used to modify control system parameters relating to the track trencher 40 using a calibration technique. The display panel 99 displays the parameter modification screens 301, 302, 303, 304, 305, 306, 307, 308, 309, 310, 311, and 312 one at a time. Various related parameters and sub-system specific parameters are logically grouped together on a particular screen 301, 302, 303, 304, 308, 309, 310, 311, and 312 or screens 305, 306, and 307 to facilitate efficient parameter modification and calibration of that particular sub-system.

Figure 7:
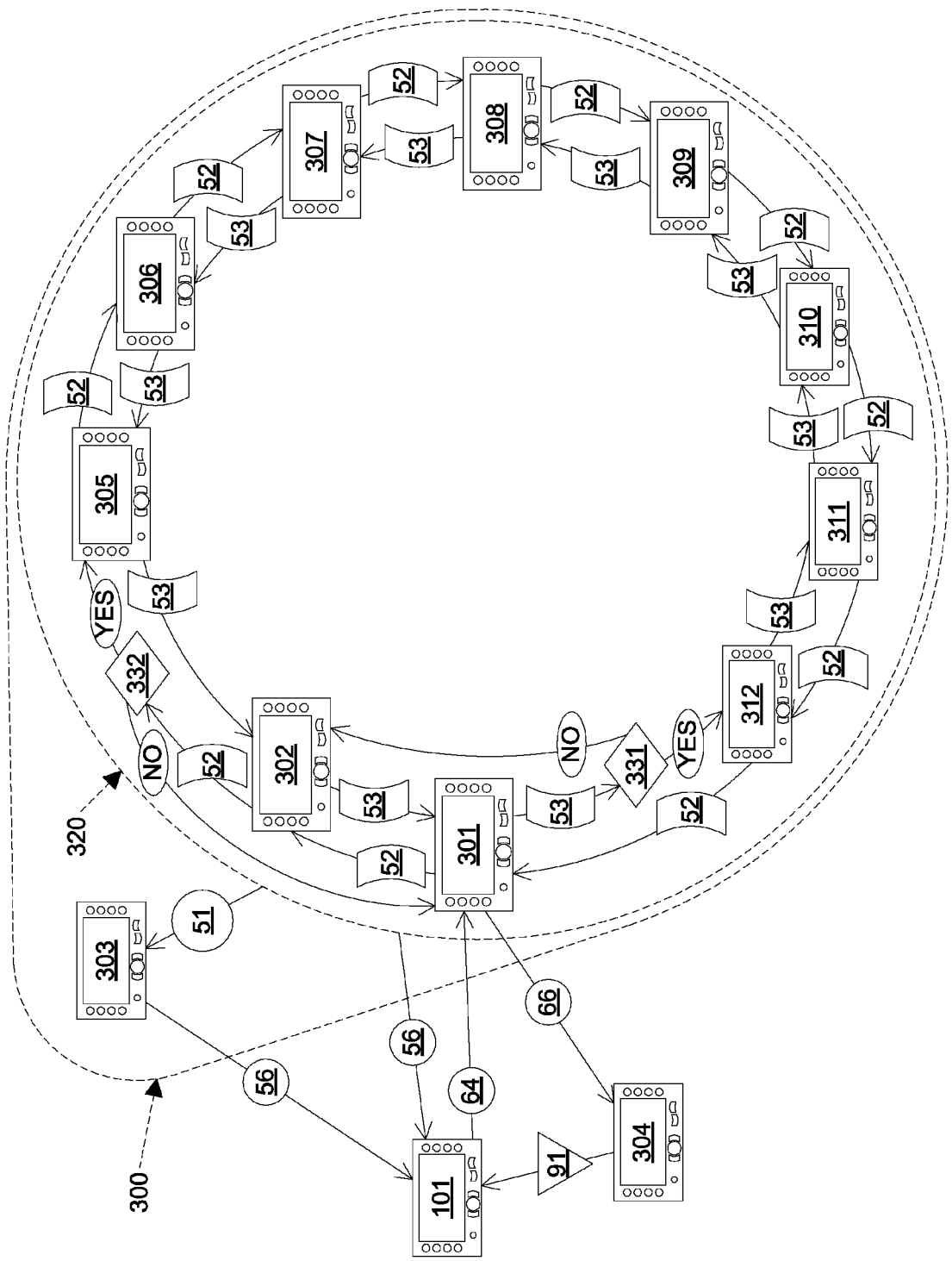
FIG. 7 is a second, mid-level navigation map further illustrating how the various screens of FIG. 5, relating to a group of control system modification and calibration screens, are selected for viewing.

FIG. 7 illustrates how to access a sub-set of the parameter modification screens 320 from the main operator panel information screen 101m. The sub-set 320 includes screens 301, 302, 305, 306, 307, 308, 309, 310, 311, and 312. Accessing the sub-set 320 is accomplished by pressing a parameter modification menu button 64 which results in the display of the password setting screen 301. Thus the password setting screen 301 serves as a main parameter modification screen 301m (see FIG. 20). A parameter modification navigation icon 157 is located near the parameter modification menu button 64 on screen 101 to symbolize this. Entering an appropriate password at this screen 301 allows access to all of the parameter modification screens 301, 302, 303, 304, 305, 306, 307, 308, 309, 310, 311, and 312 by setting password branches 331 and 332 to "yes". If the appropriate password is not entered, only screens 301, 302, 303, and 304 are accessible and the password branches 331 and 332 are set to "no". This password scheme serves as a barrier to prevent those unauthorized from setting critical parameters. Pressing the escape button 56 from any of the sub-set of parameter modification screens 320 returns the main operator panel information screen 101m. Navigation between the sub-set 320 of parameter modification screens 301, 302, 305, 306, 307, 308, 309, 310, 311, and 312 is accomplished by pressing the right scroll button 52 or the left scroll button 53 as illustrated in FIG. 7. As mentioned above, the password branches 331 and 332 can be set to "yes" by entering the appropriate password at screen 301. The threshold setting screen 303 is accessed from any of the sub-set of the parameter modification screens 320 by pressing the OK button 51. Exiting the threshold setting screen 303 is accomplished by pressing the escape button 56 which returns the main operator panel information screen 101m. The calibration screen 304 is accessed from the password setting screen 301 by pressing a calibration button 66. A calibration navigation icon 150 is located near the calibration button 66 on screen 301 to symbolize this. Various system calibrations can be selected and performed by pressing button 68 at screen 304. On this particular screen 304, the button 68 serves as a calibration initiation button 68c. Alternatively, one or more calibrations can be skipped by pressing button 67 at screen 304. On this particular screen 304, the button 67 serves as a calibration skip button 67s. Once the calibration screen 304 has been accessed, a machine restart 91 must be performed. The machine restart 91 returns the main operator panel information screen 101m.

Within the various parameter modification screens 300, control system parameters can be selected for modification by pressing an up button 54 or a down button 55. Pressing either button 54 or 55 repeatedly scrolls through the parameters available within the current screen 301, 302, 303, 305, 306, 307, 308, 309, 310, 311, or 312. With a given parameter selected, pressing button 67 raises the parameter setting while pressing button 68 lowers it. On these particular screens 301, 302, 303, 305, 306, 307, 308, 309, 310, 311, and 312 the button 67 serves as a raise setting button 67r and the button 68 serves as a lower setting button 68l. Modifying parameters within these screens has immediate effect on the control system. Certain of these parameter settings may be typically used in the routine operation of the track trencher 40 while others may be used for tuning the track trencher 40 for a special purpose or environment.

The parameter modification and calibration tool allows the track trencher 40 to be customized for various environments without the need for special tools to be transported and connected to the track trencher 40. In addition, experimentation on the control system can thus be performed and immediately tested, a technique further enabling customization of the track trencher 40 for a particular environment. If a particular experimental parameter setting has rendered the track trencher 40 dysfunctional, machine default parameter settings can be restored by accessing the password setting screen 301 and pressing the buttons 61 and 62 together and holding for 10 seconds (see FIG. 20). On this particular screen 301, the buttons 61 and 62 serve as default parameter restoring buttons 61d and 62d. Furthermore, applying the preceding technique to the example track trencher 40, having virtually every track trencher 40 related control system parameter available for customization, affords this benefit to virtually every subsystem.

The computer network disclosed in this specification may include one or more computing devices. These computing devices may be physically distributed across the track trencher 40 and may be incorporated within certain components of the track trencher 40, e.g. an engine control system may have a computing device that is incorporated into the computer network. The computing devices may be known by various names including controller and computer. The computing devices may be digital or analogue and may be programmable by software.

In certain cases, the above disclosure and figures reference a specific system of units when discussing a particular variable, e.g. RPM. It is anticipated that an alternate system of units could be used in each of these cases. It is further anticipated that a transformed system of units could be used where desired, e.g. track rotational drive speed in RPM could be transformed into linear track speed in meters per minute.

Certain signals are described above and in the figures in terms of specific signal types and units, e.g. the propel signal 132 is described as having a range of −100% to +100% and the track pump drive signals 133 are described as using milliamperes (mA) of electrical current. Various other signal types and units may be substituted for those described above without departing from the true spirit of the present invention, e.g. the track pump drive signals 133 may be replaced with a pulse-width modulation (PWM) signal. Likewise, these signals may also be transformed from signal type to signal type within the control system itself, e.g. the propel signal 132 may originate as a millivolt (mV) signal at the propel control 11 and be transformed into a digital numeric signal. These transformations may occur in various locations including within the device generating the signal, within a signal converter, within a controller, and/or within the computer network.

The above specification provides examples of how certain inventive aspects may be put into practice. It will be appreciated that the inventive aspects can be practiced in other ways than those specifically shown and described herein without departing from the spirit and scope of the inventive aspects.

What is claimed is:

1. An on-board tool for diagnosing a plurality of systems on-board a piece of mobile equipment, the on-board tool being integrated with a control system of the piece of mobile equipment and not requiring any external hardware, the system including an operator station, the on-board tool comprising:

a memory;

a display including a display screen mounted at the operator station; and a programmable circuit in electrical communication with the memory and the display, the programmable circuit programmed to generate a user interface configured to display a main operator panel information screen on the display screen in at least near-realtime, the main operator panel information screen displaying machine operating information, the display also including:

at least a first diagnostic display screen, the first diagnostic display screen being configured and operable to show a grouping of information relating to a first system of the piece of mobile equipment on the display screen in at least near-realtime, the grouping of information including: a) a first operator input including a first signal originating from a first operator input device controlling operation of the first system; b) first control system outputs including first commands communicated to first valves or first pumps of the first system; and c) first machine inputs including a first drive pressure of the first system and a first drive speed of the first system, the first machine inputs each individually adjustable via the display, thereby allowing at least near-realtime feedback regarding operation of the mobile equipment, and allowing customized operation of the first system for use in a particular environment, wherein the first system comprises at least one of:

a track drive system, wherein the first signal comprises a propel signal, wherein the first commands comprise track drive commands, wherein the first drive pressure comprises a track drive pressure and wherein the first drive speed comprises a track drive speed, and an excavation attachment system, wherein the first signal comprises an attachment speed control signal originating from an attachment speed control device, wherein the first commands comprise attachment forward and reverse commands wherein the first drive speed comprises an attachment drive speed and wherein the first drive pressure comprises an attachment drive pressure.

2. The on-board tool of claim 1, wherein the first diagnostic screen shows a steering signal originating from a second operator input device.

3. The on-board tool of claim 1, wherein the diagnostic display screens further include a boom diagnostic screen having a grouping of information relating to a boom of the piece of mobile equipment and a conveyor diagnostic screen having a grouping of information relating to a conveyor of the piece of mobile equipment.

4. The on-board tool of claim 1, wherein the first diagnostic screen shows engine speed.

5. The on-board tool of claim 1, wherein the operator station includes a load control knob, and wherein the first diagnostic screen shows a load control signal controlled by operator manipulation of the load control knob.

6. The on-board tool of claim 2, wherein the operator station includes a load control knob, and wherein the first diagnostic screen shows a load control signal controlled by operator manipulation of the load control knob.

7. The on-board tool of claim 1, wherein the first signal and the first commands are displayed as voltages.

8. The on-board tool of claim 1, wherein the track drive commands include forward and reverse electronic displacement control commands, and wherein the first diagnostic screen shows track drive command electronic displacement control thresholds.

9. The on-board tool of claim 1, wherein the first diagnostic screen also shows at least one of an attachment case temperature, an attachment charger pressure and an accumulator precharge.

10. The on-board tool of claim 3, wherein the boom diagnostic screen shows at least one of a boom up-down control signal, a boom valve up command, a boom valve down command and boom cylinder depth signal.

11. An on-board tool for diagnosing a plurality of systems on-board a piece of mobile equipment, the on-board tool being integrated with the piece of mobile equipment and not requiring any external hardware, the piece of mobile equipment also including left and right tracks for propelling the piece of mobile equipment, the piece of mobile equipment also including an excavation attachment, the piece of mobile equipment further including an operator station including a track propel control device and an attachment speed control device, the on-board tool comprising:

a memory;

a control panel arrangement at the operator station, the control panel arrangement including a screen display device;

a control system in electrical communication with the memory and the control panel arrangement, the control system programmed to display an operator panel information screen on the screen display device, the operator panel information screen displaying machine operating information, the control system also programmed to selectively display a plurality of different diagnostic display screens on the screen display device in at least near-realtime, the diagnostic display screens including:

a track diagnostic screen showing a grouping of information relating to the left and right tracks, the grouping of information including: a) an operator input including a propel signal originating from the track propel control device; b) control system outputs including left and right track commands; and c) machine inputs including track pressure and track speed; and an attachment diagnostic screen including a grouping of information relating to an excavation attachment of the piece of mobile equipment;

wherein each of a plurality of operator inputs to the mobile equipment is reflected in the grouping of information on at least one of the track diagnostic screen or the attachment diagnostic screen, thereby allowing at least near-realtime feedback regarding operation of the mobile equipment, and allowing customized operation of the mobile equipment in a particular environment.

12. The on-board tool of claim 11, wherein the machine inputs shown on the track diagnostic screen include engine speed, wherein the operator station includes a steering control device, and wherein the track diagnostic screen shows a steering signal controlled by operator manipulation of the steering control device.

13. The on-board tool of claim 12, wherein the attachment diagnostic screen shows: a) an operator input including an attachment speed control signal originating from the attachment speed control device; b) control system outputs including attachment forward and reverse commands; and c) machine inputs including attachment speed and attachment pressure.

14. The on-board tool of claim 13, wherein the tracks are driven by a hydrostatic track drive, wherein the track pressure is a hydrostatic drive pressure of the hydrostatic track drive, wherein the track speed is a drive speed of the hydrostatic track drive, wherein the attachment is driven by a hydrostatic attachment drive, wherein the attachment pressure is a hydrostatic drive pressure of the hydrostatic attachment drive, and wherein the attachment speed is a drive speed of the hydrostatic attachment drive.

15. The on-board tool of claim 11, wherein the diagnostic display screens include a boom diagnostic screen having a grouping of information relating to a boom of the piece of mobile equipment.

16. The on-board tool of claim 11, wherein the diagnostic display screens include a conveyor diagnostic screen having a grouping of information relating to a conveyor of the piece of mobile equipment.

17. The on-board tool of claim 11, wherein the excavation attachment includes a trenching chain driven by a hydrostatic drive.

18. The on-board tool of claim 11, wherein the operator panel information screen displays an engine speed, an attachment speed, an attachment pressure and a steering position.

19. An on-board tool for diagnosing a plurality of systems on-board a piece of mobile equipment, the on-board tool being integrated with the piece of mobile equipment and not requiring any external hardware, the piece of mobile equipment also including left and right tracks for propelling the piece of mobile equipment, the piece of mobile equipment also including an excavation attachment, the piece of mobile equipment further including an operator station including a track propel control device and an attachment speed control device, the on-board tool comprising:

a memory;

a display including a display screen mounted at the operator station;

a programmable circuit in electrical communication with the memory and the display, the programmable circuit programmed to generate a user interface configured to display a main operator panel information screen on the display screen, the main operator panel information screen displaying machine operating information, the display also including a diagnostic screen access item that when selected by an operator provides access to a plurality of diagnostic display screens, the diagnostic display screens including:

a track diagnostic screen showing a grouping of information displayable in at least near-realtime relating to the left and right tracks, the grouping of information including:

a) an operator input including a propel signal originating from the track propel control device; b) control system outputs including left and right track drive commands; and c) machine inputs including track pressure and track speed;

an attachment diagnostic screen including a grouping of information displayable in at least near-realtime relating to an excavation attachment of the piece of mobile equipment, the grouping of information including: a) an operator input including an attachment speed control signal originating from the attachment speed control device; b) control system outputs including attachment forward and reverse commands; and c) machine inputs including attachment speed and attachment pressure; and a boom diagnostic screen having a grouping of information displayable in at least near-realtime relating to a boom of the piece of mobile equipment, the boom diagnostic screen showing at least one of a boom up-down control signal, a boom valve up command, a boom valve down command and boom cylinder depth signal;

wherein the display also includes an escape item that can be selected by the operator to return from the diagnostic display screens back to the main operator panel information screen wherein each of a plurality of operator inputs to the mobile equipment is reflected in the grouping of information on at least one of the track diagnostic screen, attachment diagnostic screen, or boom diagnostic screen, thereby allowing at least near-realtime feedback regarding operation of the mobile equipment, and allowing customized operation of the mobile equipment in a particular environment.

20. The on-board tool of claim 19, wherein the tracks are driven by a hydrostatic track drive, wherein the track pressure is a hydrostatic drive pressure of the hydrostatic track drive, wherein the track speed is a drive speed of the hydrostatic track drive, wherein the attachment is driven by a hydrostatic attachment drive, wherein the attachment pressure is a hydrostatic drive pressure of the hydrostatic attachment drive, and wherein the attachment speed is a drive speed of the hydrostatic attachment drive.

21. The on-board tool of claim 19, wherein the diagnostic display screens include a conveyor diagnostic screen having a grouping of information relating to a conveyor of the piece of mobile equipment.

22. The on-board tool of claim 19, wherein the excavation attachment includes a trenching chain driven by a hydrostatic drive.

23. The on-board tool of claim 19, wherein the operator panel information screen displays an engine speed, an attachment speed, an attachment pressure and a steering position.

24. The on-board tool of claim 20, wherein the track diagnostic screen shows a steering signal originating from an operator controlled steering control device, wherein the track diagnostic screen shows a load control signal originating from an operator controlled load control device, wherein the track diagnostic screen also shows engine speed, wherein the track drive commands include forward and reverse electronic displacement control commands, and wherein the track diagnostic screen shows track drive command electronic displacement control thresholds.

* * * * *